(12) United States Patent
Reidy et al.

(10) Patent No.: US 12,077,660 B2
(45) Date of Patent: Sep. 3, 2024

(54) THERMAL DEBINDING TECHNIQUES FOR ADDITIVE MANUFACTURING AND RELATED SYSTEMS AND METHODS

(71) Applicant: Desktop Metal, Inc., Burlington, MA (US)

(72) Inventors: John Reidy, Somerville, MA (US); Christopher Craven, Bedford, MA (US); Nihan Tuncer, Cambridge, MA (US); Animesh Bose, Leesburg, VA (US); Alexander C. Barbati, Melrose, MA (US); Ricardo Fulop, Lexington, MA (US); Brian D. Kernan, Andover, MA (US); Karl-Heinz Schofalvi, Hudson, OH (US)

(73) Assignee: Desktop Metal, Inc., Burlington, MA (US)

( * ) Notice: Subject to any disclaimer, the term of this patent is extended or adjusted under 35 U.S.C. 154(b) by 217 days.

(21) Appl. No.: 17/097,648

(22) Filed: Nov. 13, 2020

(65) Prior Publication Data
US 2021/0147665 A1    May 20, 2021

Related U.S. Application Data

(60) Provisional application No. 63/000,816, filed on Mar. 27, 2020, provisional application No. 62/979,636, (Continued)

(51) Int. Cl.
*B22F 10/64*    (2021.01)
*B22F 10/18*    (2021.01)
(Continued)

(52) U.S. Cl.
CPC .............. *C08L 23/12* (2013.01); *B22F 10/18* (2021.01); *B22F 10/64* (2021.01); *B28B 1/001* (2013.01);
(Continued)

(58) Field of Classification Search
CPC ....................................................... B22F 10/64
See application file for complete search history.

(56) References Cited

U.S. PATENT DOCUMENTS 4,731,208 A * 3/1988 Nakajima .......... B01D 11/0203
428/688
2015/0232667 A1   8/2015 Pompe et al.
(Continued)

FOREIGN PATENT DOCUMENTS

EP    3321002 A1    5/2018

OTHER PUBLICATIONS

PCT/US2020/060489, Jan. 19, 2021, Invitation to Pay Additiional Fees.
(Continued)

*Primary Examiner* — Christopher S Kessler
(74) *Attorney, Agent, or Firm* — Wolf, Greenfield & Sacks, P.C.

(57) ABSTRACT

Techniques for debinding additively fabricated parts are described that do not require solvent debinding or catalytic debinding, and that may be performed using only thermal debinding in a furnace. As a result, in at least some cases debinding and sintering may take place sequentially within a single furnace. In some embodiments, the techniques may utilize particular materials as binders that allow for a thermal debinding process that does not negatively affect the parts.

12 Claims, 15 Drawing Sheets

Related U.S. Application Data filed on Feb. 21, 2020, provisional application No. 62/936,172, filed on Nov. 15, 2019.

(51) Int. Cl.

| | | |
|---|---|---|
| *B28B 1/00* | (2006.01) | |
| *B29C 64/165* | (2017.01) | |
| *B33Y 10/00* | (2015.01) | |
| *B33Y 70/10* | (2020.01) | |
| *C08L 23/12* | (2006.01) | |
| *B29K 505/00* | (2006.01) | |
| *B29K 509/02* | (2006.01) | |

(52) U.S. Cl.
CPC ............ B29C 64/165 (2017.08); B33Y 10/00 (2014.12); B33Y 70/10 (2020.01); *B29K 2505/00* (2013.01); *B29K 2509/02* (2013.01)

(56) References Cited

U.S. PATENT DOCUMENTS

| | | | |
|---|---|---|---|
| 2018/0133367 A1* | 5/2018 | Gibson | .................. B22F 10/50 |
| 2018/0154437 A1 | 6/2018 | Mark | |
| 2018/0162013 A1 | 6/2018 | Fulop et al. | |
| 2018/0162044 A1 | 6/2018 | Gibson et al. | |
| 2019/0001410 A1 | 1/2019 | Ho et al. | |
| 2019/0077054 A1 | 3/2019 | Jessen et al. | |
| 2019/0270254 A1 | 9/2019 | Mark et al. | |
| 2019/0389090 A1 | 12/2019 | Roy-Mayhew et al. | |
| 2021/0260655 A1* | 8/2021 | Lee | ........................... B22F 9/04 |

OTHER PUBLICATIONS

Kernan et al., Three dimensional printing of Tungsten carbide-cobalt using a cobalt oxide precursor. International Solid Freeform Fabrication Symposium. 2003. pp. 616-631.

Invitation to Pay Additional Fees mailed Jan. 19, 2021 in connection with International Application No. PCT/US2020/060489.

International Search Report and Written Opinion mailed Mar. 22, 2021 in connection with International Application No. PCT/US2020/060489.

Han et al., Fabrication of high-aspect-ratio micro piezoelectric array by powder injection molding. Ceramics International. 2016;42(8):9475-81.

PCT/US2020/060489, Mar. 22, 2021, International Search Report and Written Opinion.

Extended European Search Report dated Oct. 19, 2023 for European Application No. 20886449.6.

Partial Supplementary European Search Report dated Jul. 18, 2023 in connection with European Application No. 20886449.6.

International Preliminary Report on Patentability mailed May 27, 2022 in connection with International Application No. PCT/US2020/060489.

* cited by examiner

Metal Particles
401

Binder comprising primary binder, secondary binder and other additives
403

Sublimed primary binder
405

THERMAL DEBINDING TECHNIQUES FOR ADDITIVE MANUFACTURING AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/936,172, filed Nov. 15, 2019, titled "Systems and Methods for Using Sublimeable Binders for Additive Manufacturing," U.S. Provisional Patent Application No. 62/979,636, filed Feb. 21, 2020, titled "Materials and Processes for 3D Printing of Sinterable Objects," and U.S. Provisional Patent Application No. 63/000,816, filed Mar. 27, 2020, titled "Materials and Processes for 3D Printing of Sinterable Objects," each of which is hereby incorporated by reference in its entirety.

TECHNICAL FIELD

Various aspects of the present disclosure relate generally to systems and methods for debinding parts formed by additive manufacturing, and, in some cases, for debinding metal parts formed by additive manufacturing.

BACKGROUND

Metal injection molding (MIM) is a metalworking process useful in creating a variety of metal objects. A mixture comprising powdered metal and one or more binders may form a "feedstock" capable of being molded, when heated, into the shape of a desired object. The initial molded part, also referred to as a "green part," may then undergo a preliminary debinding process (e.g., solvent debinding) to remove primary binder while leaving secondary binder intact, followed by a sintering process. During sintering, the part may be heated to vaporize and remove the secondary binder (thermal debinding) and brought to a temperature near the melting point of the powdered metal, which may cause the metal powder to densify into a solid mass, thereby producing the desired metal object. A similar process can be used to shape other materials such as ceramic and composite materials. A process that includes nearly all of the above materials as well as metals and alloys is known as powder injection molding (PIM).

Additive manufacturing, which includes three-dimensional (3D) printing, includes a variety of techniques for manufacturing a three-dimensional object by successively forming portions of the object (e.g., successively forming layers). Additive fabrication devices may in some cases form parts from a feedstock comparable to that used in MIM or PIM, thereby creating a green part without the need for a mold. The green part may then undergo debinding and sintering processes to produce a final part.

SUMMARY

According to some aspects, a build material for additive fabrication is provided, the build material comprising at least one metal or ceramic powder, and a binder comprising an organic primary binder component having a vol % within the binder of at least 30 vol % and less than 60 vol %, and a secondary binder component, wherein the primary binder component comprises a hydrophobic moiety and a hydrophilic moiety, and wherein the hydrophobic moeity is a substituted or unsubstituted aliphatic chain of 10 to 20 carbon atoms.

According to some embodiments, the aliphatic chain is an unsubstituted aliphatic chain.

According to some embodiments, the hydrophilic moiety is a hydrogen bonding moiety.

According to some embodiments, the hydrogen bonding moiety is a hydrogen bond donor and a hydrogen bond acceptor.

According to some embodiments, the primary binder component is an alcohol, a carboxylic acid, or an amine.

According to some embodiments, the primary binder component is a fatty alcohol.

According to some embodiments, the primary binder component is octadecanol.

According to some embodiments, the primary binder component is 1-octadecanol.

According to some embodiments, the secondary binder component comprises polypropylene.

According to some embodiments, the secondary binder component has a vol % within the binder of at least 40 vol % and less than 60 vol %.

According to some embodiments, the binder further comprises a tackifier.

According to some embodiments, the tackifier comprises ethylene vinyl acetate (EVA).

According to some embodiments, the tackifier has a vol % within the binder of at least 10 vol % and less than 15 vol %.

According to some embodiments, the binder further comprises a wetting agent.

According to some embodiments, the wetting agent includes at least one of stearic acid, sodium stearate, linoleic acid, behenic acid, palmitic acid, and isostearyl titanate.

According to some aspects, a build material for additive fabrication is provided, the build material comprising at least one metal powder, and a binder comprising a primary binder component, and a secondary binder component, wherein the primary binder component has a melting point above 40° C. and below 100° C., and wherein the primary binder component has a vapor pressure above 0.05 Torr at all temperatures between 50° C. and 160° C.

According to some embodiments, the primary binder component has a vol % within the binder of at least 30 vol % and less than 60 vol %.

According to some embodiments, the primary binder component has a vol % within the binder of at least 40 vol % and less than 50 vol %.

According to some embodiments, the primary binder component has a melting point above 40° C. and below 100° C.

According to some embodiments, the primary binder component is a fatty alcohol.

According to some embodiments, the primary binder component is octadecanol.

According to some embodiments, the secondary binder component comprises polypropylene.

According to some embodiments, the secondary binder component has a vol % within the binder of at least 40 vol % and less than 60 vol %.

According to some embodiments, the binder further comprises a tackifier.

According to some embodiments, the tackifier comprises ethylene vinyl acetate (EVA).

According to some embodiments, the binder further comprises a wetting agent.

According to some embodiments, the wetting agent includes at least one of stearic acid, sodium stearate, linoleic acid, behenic acid, palmitic acid, and isostearyl titanate According to some aspects, a method of forming a metal part via additive fabrication is provided, the method comprising forming a three-dimensional part from a build material through additive fabrication, wherein the build material comprises at least one metal powder and a binder including a primary binder component and a secondary binder component, wherein forming the part comprises heating the build material to a deposition temperature and extruding the heated build material onto a substrate, heating the part in a furnace at a first temperature below the deposition temperature to cause evaporation and/or sublimation of the primary binder component, wherein the first temperature is below a melting point of the secondary binder component, heating the part in the furnace at a second temperature to cause conversion to a gas of the secondary binder component subsequent to said heating of the part at the first temperature, wherein the second temperature is greater than the melting point of the secondary binder component, and heating the part in the furnace at a third temperature to sinter the at least one metal powder subsequent to said heating of the part at the second temperature, wherein the third temperature is greater than the second temperature.

According to some embodiments, the first temperature is greater or equal to 50° C. and less than or equal to 100° C.

According to some embodiments, the method further comprises operating the furnace to have an internal ambient pressure of less than 10 Torr during said heating at the first temperature.

According to some embodiments, the method further comprises operating the furnace to have an internal ambient pressure of less than 10 Torr during said heating at the second temperature According to some embodiments, operating the furnace to have an internal ambient pressure of less than 10 Torr comprises controlling gas flow through the furnace to remove the primary binder component from within the furnace while maintaining the internal ambient pressure of less than 10 Torr.

According to some embodiments, the method further comprises pumping a gas into the furnace during said heating at the first temperature.

According to some embodiments, the second temperature is greater or equal to 250° C. and less than or equal to 500° C.

According to some embodiments, the third temperature is greater or equal to 800° C. and less than or equal to 1500° C.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1A:
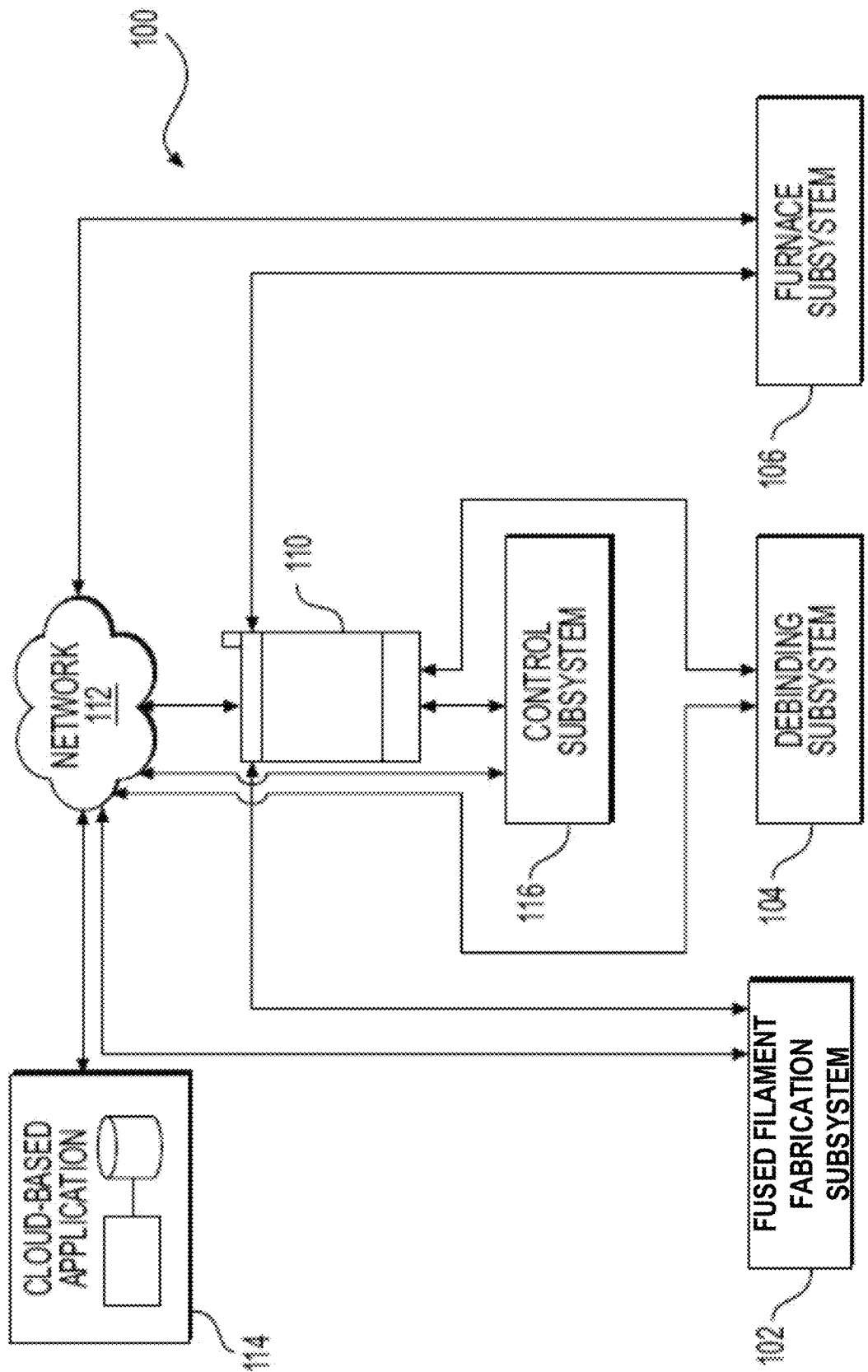
FIG. 1A is a block diagram of an additive manufacturing system according to some embodiments.

Fused Filament Fabrication (FFF) is a type of additive fabrication that extrudes a build material (also called a feedstock) onto a substrate such as a build platform to form an object. Generally the build material includes some kind of thermoplastic that is pushed through a heated extruder head. In some cases, the heated extruder head moves relative to the build platform during the deposition process resulting in the successive formation of the object. In one approach to FFF-style fabrication sometimes referred to as Bound Metal Deposition (BMD), the build material may include one or more powders so that the fabricated part includes a solid in powder form in addition to other components. The powders within the build material may include, either individually or as a part of a mixture of powders, metallic powders, ceramic powders, oxide powders, and/or carbide powders. In some approaches, these other components may include one or more binders that hold the powder(s) together, and which are removed subsequent to fabrication of the part. The debound part may then be sintered in a furnace to produce a solid metal object.

The debinding stage conventionally includes several steps and utilizes several different pieces of hardware. For example, a first debinding stage may occur in a solvent bath which chemically removes at least some of the binders, followed by a second debinding stage that may occur within a furnace. This solvent debinding stage may be problematic for several reasons, however. First, this stage may take several hours or days since the chemical solvent must permeate the part to dissolve the binder, and the primary binder may take time to dissolve in the solvent. Second, the dissolving of the primary binder may create open channels in the part. Third, solvent may cause swelling of the part. Relatively thinner portions of the part may swell quicker or may swell more than relatively thicker portions of the part, due to uneven permeation time of the solvent into the part. Such swelling may result in distortion or cracking of the part, particularly at the intersection of thinner and thicker portions.

Other debinding approaches may not rely on solvent debinding. One such approach instead utilizes a catalytic debinding process in which parts are debound in nitric acid vapor at an elevated temperature. This approach can also be problematic, however, because a separate furnace must be used to perform the catalytic debinding separate from the subsequent sintering process. In addition, the nitric acid vapor must be managed to protect users from its dangerous health effects and components of the oven must be designed to handle the acidic and aggressive nature of the nitric acid vapor at temperatures between 100° C. and 140° C.

The inventors have recognized and appreciated techniques for debinding additively fabricated parts that do not require solvent debinding or catalytic debinding, but may be performed by only thermal debinding in a furnace. As a result, in at least some cases debinding and sintering may take place sequentially within a single furnace. In some embodiments, the techniques may utilize particular materials as binders that allow for a thermal debinding process that does not negatively affect the parts.

Conventionally, one challenge with thermal-only debinding is that if binder material is incompletely removed during debinding, the remaining material may begin to flow while the parts are heated, thereby deforming or otherwise changing the shape of the part. If the primary binder is incompletely removed, for instance, it will typically have a plasticizing and lubricating effect upon the remaining components of the build material and will encourage the flow of the build material as the temperature is raised in the furnace. Such flow may be similar to the manner in which the material flowed when initially forming the parts using FFF, which may cause the object to flow, warp, tilt, slump, collapse, form blisters, and/or crack.

According to some embodiments, a build material (also referred to herein as a feedstock) for additive fabrication may include a primary binder component that has particular material properties that allow the component to be fully (or nearly fully) removed from parts during thermal processing without causing the aforementioned undesirable flow of the remaining material within the parts. The inventors have recognized and appreciated that the melting point and/or vapor pressure of the primary binder component are important properties to consider when selecting a suitable primary binder component (also referred to herein as a "primary binder"), so that the component can be completely removed through heating (thereby causing evaporation and/or sublimation of the primary binder component) without causing deformation of the parts.

The melting point of the primary binder component, for instance, may dictate the temperatures at which the primary binder component can be removed through thermal treatment and may also influence at least some of the mechanical properties of a part containing the binder at room temperature. If the melting point is too high, it may not be possible to remove the primary binder component without causing deleterious effects on the part during thermal treatment; conversely, if the melting point is too low, the parts may be too soft at room temperature. As a contrasting example, it has been observed by the inventors that use of paraffin wax as a conventional primary binder component within a feedstock can cause deformation of fabricated parts if only thermal debinding is performed. The inventors have recognized and appreciated that this occurs because the temperature at which the paraffin wax evaporates is sufficiently high to cause the remaining components of the feedstock to soften and flow, thereby damaging the part, before the paraffin wax can be safely removed. Thus, conventionally, parts formed from a feedstock that includes paraffin wax are typically chemically debound prior to thermal treatment.

According to some embodiments, a build material for additive fabrication may comprise metal and/or ceramic powder in addition to a binder. The binder may include an organic primary binder component that comprises between 30% and 60% by volume of the binder. The organic primary binder component may have a melting point above 40° C. and below 140° C., and may have a vapor pressure above 0.05 Torr at all temperatures between 50° C. and 160° C. These properties may result in the aforementioned behavior during thermal treatment that allows removal of the binder component from the build material without damage to the parts. In some embodiments, the organic binder component may comprise both a hydrophobic moiety and a hydrophilic moiety. For instance, the organic binder component may be an alcohol, a carboxylic acid, or an amine. In some embodiments, the organic binder component may comprise a hydrophobic moeity that is a substituted or unsubstituted aliphatic chain of 10 to 20 carbon atoms. Such a moeity may result in the above-mentioned desirable melting point and vapor pressure properties.

Build materials as described above, coupled with a suitable thermal process as described below, may address the above-described deficiencies of solvent debinding and catalytic debinding. The techniques described herein may provide a faster debinding process that is also less likely to lead to defects in a final part in addition to removing the need to move debound parts (which may be delicate) between or within devices, such as is performed in solvent debinding and catalytic debinding.

The feedstock for forming a green part, and thus the final part, may comprise a powder (e.g., metal powder particles and/or ceramic powder), a primary binder and a secondary binder. The feedstock may further include wetting agents, slip agents/lubricants, and die release agents. The feedstock may also comprise a continuous phase and a discrete phase, in which components of the feedstock (e.g., binders, metal particles, lubricants, wetting agents, tackifiers, etc.) may be assigned to each phase with a predetermined function.

In some embodiments, the build material from which green parts are formed may include a primary binder (e.g., a sublimable binder, or an evaporable binder) and a secondary binder. Green parts may be placed in a furnace and kept under appropriate vacuum (or low or controlled partial pressure of a specific individual gas species or mixture of gas species) and temperature conditions for a predetermined period of time so as to cause sublimation of the primary binder. Maintaining a vacuum or low partial pressure may ensure that the component in gas form may not deposit back onto the part or within the furnace. Alternately or in addition, ensuring that the binder in gas form does not deposit back into a part and/or within a furnace may be accomplished with a sweep gas at any pressure, where the rate of gas flow (or chamber turnovers) may be increased with the pressure. In such embodiments, the primary binder may covert to a gas while the secondary binder stays intact, as described further below.

Some embodiments may include heating a furnace to just below the melting point of a primary binder component to maximize the rate of the component's conversion to gas (e.g., through sublimation), and removing the gas (from the part or vicinity of the part) by either a flowing gas sweep or by vacuum. Flowing gas may also be used in the furnace no matter what the vacuum level/pressure may be, and this can increase the rate of sublimation at any temperature/vacuum combination. This may be an advantage, since the temperature condition(s) for sublimation may be adjusted by adjusting the pressure. This may be because the melting points of most candidate sublimable materials (e.g., durene) may change with pressure. The ability to select the sublimation temperature (within a range) may advantageously provide more options on which secondary binders may be paired with the primary binders.

For purposes of illustration, FIGS. 1A-1D depict a conventional process of forming an additive fabricated part using Fused Filament Fabrication (FFF) to produce a green part, following by solvent debinding to produce a brown part, followed by sintering in a furnace to produce a final part.

FIG. 1A is a block diagram of an additive manufacturing system according to some embodiments of the disclosure. System 100 includes an additive fabrication device (also sometimes called a three-dimensional (3D) printer) such as a fused filament fabrication (FFF) subsystem 102, a debinding subsystem 104 and a furnace subsystem 106 for treating the green part after fabrication. Fused filament fabrication subsystem 102 may be used to form an object from a build material, for example, by depositing successive layers of the build material onto a build plate. The build material may include metal powder and at least one binder material. In some embodiments, the build material may include a primary binder and a secondary binder (e.g., a polymer such as polypropylene).

Debinding subsystem 104 may be configured to treat the green part produced by fused filament fabrication subsystem 102 by performing a first debinding process in which a primary binder material may be removed from the green part. As discussed above, the first debinding process may traditionally be a solvent debinding process, as will be described in further detail with reference to FIG. 1C. In such cases, the primary binder material may dissolve in a debinding fluid while the secondary binder material remains, holding the metal particles in place in the brown part.

Furnace subsystem 106 may be configured to treat the brown part by performing a secondary debinding process in which the secondary binder and/or any remaining primary binder may be vaporized and removed from the printed part. In some embodiments, the secondary debinding process may comprise a thermal debinding process in which the furnace subsystem 106 may be operated to heat the part to vaporize the secondary binder (or otherwise convert the secondary binder to a gas).

As shown in FIG. 1A, system 100 may also include a user interface 110, which may be operatively coupled to one or more components, for example, to fused filament fabrication subsystem 102, debinding subsystem 104, and furnace subsystem 106, etc. In some embodiments, user interface 110 may be a remote device (e.g., a computer, a tablet, a smartphone, a laptop, etc.) or an interface incorporated into system 100, e.g., on one or more of the components. User interface 110 may be wired or wirelessly connected to one or more of fused filament fabrication subsystem 102, debinding subsystem 104, and/or furnace subsystem 106.

System 100 may also include a control subsystem 116, which may be included in user interface 110, or may be a separate element.

Fused filament fabrication subsystem 102, debinding subsystem 104, furnace subsystem 106, user interface 110, and/or control subsystem 116 may each be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., part geometries, printing material, one or more support and/or support interface details, printing instructions, binders, heating and/or sintering times and temperatures, etc., for one or more parts or one or more parts to be printed.

Moreover, network 112 may be connected to a cloud-based application 114, which may also provide a data transfer connection between the various components and cloud-based application 114 in order to provide a data transfer connection, as discussed above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage and/or processing device within or operably coupled to one or more of fused filament fabrication subsystem 102, debinding subsystem 104, sintering furnace subsystem 106, user interface 110, and/or control subsystem 116. In this aspect, fused filament fabrication subsystem 102, debinding subsystem 104, furnace subsystem 106, user interface 110, and/or control subsystem 116 may be disconnected from the Internet and/or other networks, which may increase security protections for the components of system 100. In either aspect, an additional controller (not shown) may be associated with one or more of fused filament fabrication subsystem 102, debinding subsystem 104, and furnace subsystem 106, etc., and may be configured to receive instructions to form the printed object and to instruct one or more components of system 100 to form the printed object.

Figure 1B:
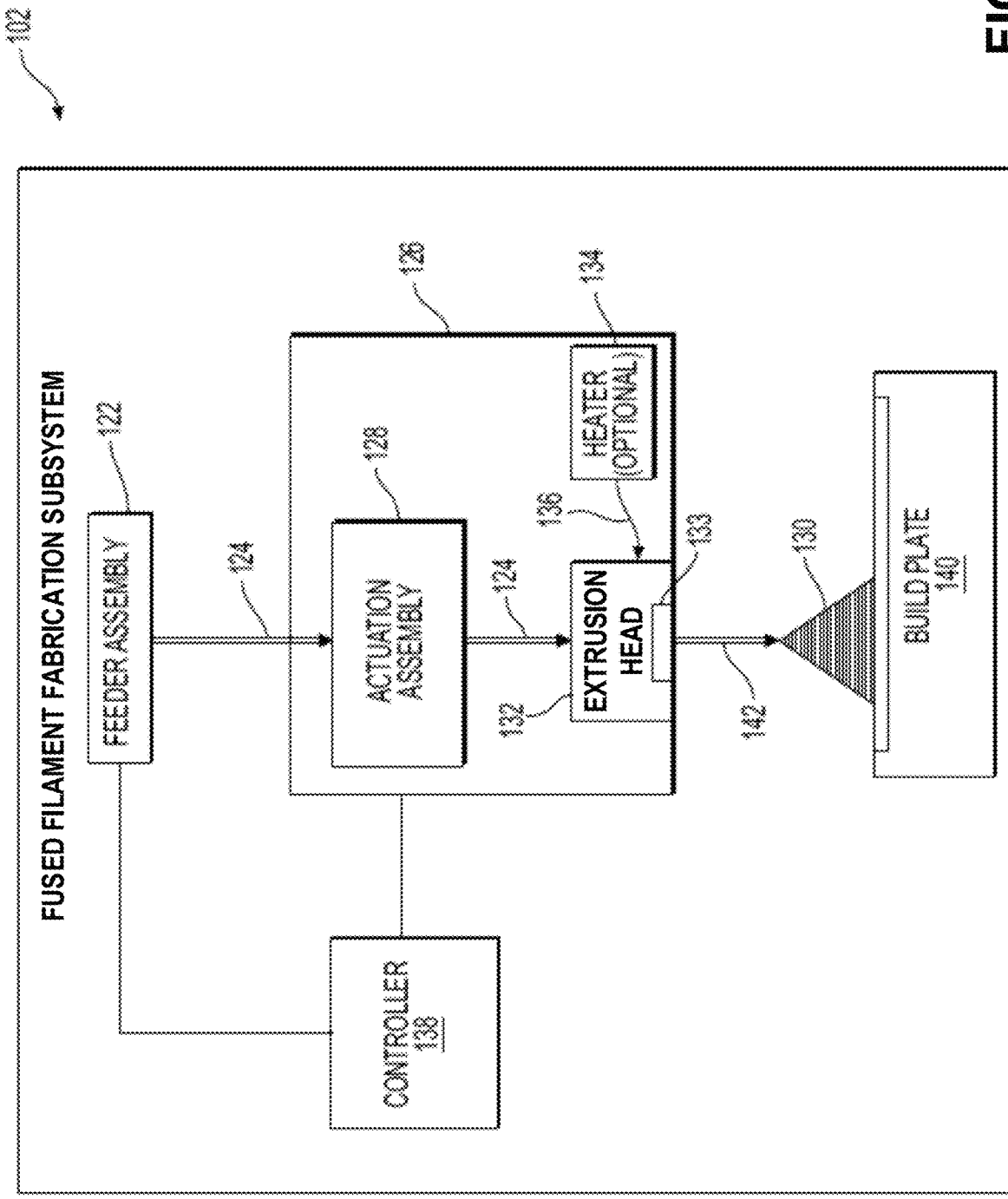
FIG. 1B is a block diagram of an illustrative Fused Filament Fabrication (FFF) subsystem of system of FIG. 1A, according to some embodiments.

FIG. 1B is a block diagram of an illustrative Fused Filament Fabrication (FFF) subsystem, according to some embodiments. In the example of FIG. 1B, the fused filament fabrication subsystem 102 may extrude a build material 124 (which may also be referred to as a feedstock 124) to form a three-dimensional part. As described above, the build material may include a mixture of metal powder and a binder containing one or more components. In some embodiments, the build material may include a mixture of a ceramic powder and a binder containing one or more components. In general, the build material may include any combination of metal powder, plastics, wax, ceramics, polymers, among others. In some embodiments, the build material 124 may come in the form of a rod or filament comprising a composition of metal powder and one or more binder components (e.g., a primary and a secondary binder).

Fused filament fabrication subsystem 102 may include an extrusion assembly 126 comprising an extrusion head 132. Fused filament fabrication subsystem 102 may include an actuation assembly 128 configured to move the build material 124 into the extrusion head 132. For example, the actuation assembly 128 may be configured to move a rod of build material 124 into the extrusion head 132. In some embodiments, the build material 124 may be continuously provided, e.g., as a spool of feedstock filament or fiber from the feeder assembly 122 to the actuation assembly 128, which in turn may move the build material 124 into the extrusion head 132. In some embodiments, the actuation assembly 128 may employ a linear actuator to continuously grip or push the build material 124 from the feeder assembly 122 towards and into the extrusion head 132.

In some embodiments, the fused filament fabrication subsystem 102 includes a heater 134 configured to generate heat 136 such that the build material 124 moved into the extrusion head 132 may be heated to a workable state. In some embodiments, the heater 134 may be integral to the extrusion head 132. As used herein, a "workable state" of a build material may refer to a build material that is able to be actuated through the extrusion head. In some cases, a "workable state" may also refer to a build material able to adhere to the build plate and/or cohere to successively deposited volumes of build material.

The build material 124 may be heated to a temperature at or below the temperature of the heater, depending on how long the build material is in proximity to the heater and/or how close the build material is to the heater. For example the heater may, when operated, heat to a temperature that is between 160° C. and 200° C., and when the build material is extruded through the extrusion apparatus (to which the heater may be integral as noted above), the build material may be heated to within several degrees of the operating temperature of the heater. By way of example, for a heater temperature of 165° C., the temperature of the build material may be heated up to, at most of 165° C. The temperature of the build material during extrusion may be referred to herein as a "deposition temperature." In the above example, for instance, the deposition temperature of the build material is 165° C.

According to some embodiments, a deposition temperature during additive fabrication may be equal to or greater than 100° C., 120° C., 140° C., 160° C., 170° C., 180° C., 190° C. or 200° C. According to some embodiments, a deposition temperature during additive fabrication may be less than or equal to 200° C., 190° C., 180° C., 170° C., 160° C., 140° C., 120° C., or 100° C. Any suitable combinations of the above-referenced ranges are also possible (e.g., a deposition temperature during additive fabrication of greater or equal to 140° C. and less than or equal to 170° C.).

In some embodiments, the heated build material 124 may be extruded through a nozzle 133 to extrude workable build material 142 onto a build plate 140. It is understood that the heater 134 is an exemplary device for generating heat 136, and that heat 136 may be generated in any suitable way, e.g., via friction of the build material 124 interacting with the extrusion assembly 126, in alternative embodiments. While there is one nozzle 133 shown in FIG. 1B, it is understood that the extrusion assembly 126 may comprise more than one nozzle in other embodiments. In some embodiments, the fused filament fabrication subsystem 102 may include another extrusion assembly (not shown in FIG. 1B) configured to extrude a non-sintering ceramic material onto the build plate 140.

In some embodiments, the fused filament fabrication subsystem 102 comprises a controller 138. The controller 138 may be configured to position the nozzle 133 along an extrusion path (also referred to as a toolpath) relative to the build plate 140 such that the workable build material is deposited on the build plate 140 to fabricate a three-dimensional green part 130. The controller 138 may be configured to manage operation of the fused filament fabrication subsystem 102 to fabricate the green part 130 according to a three-dimensional model. In some embodiments, the controller 138 may be remote or local to the metal printing subsystem 102. The controller 138 may be a centralized or distributed system. In some embodiments, the controller 138 may be configured to control a feeder assembly 122 to dispense the build material 124. In some embodiments, the controller 138 may be configured to control the extrusion assembly 126, e.g., the actuation assembly 128, the heater 134, the extrusion head 132, or the nozzle 133. In some embodiments, the controller 138 may be included in the control subsystem 116.

Fused filament fabrication subsystem 102 may separate the ambient environment inside and outside of the printer (e.g., the laboratory or office space) to provide for a controlled ambient environment within the printer. The subsystem may also include a filtration mechanism to capture any material that leaves the binder (from sublimation, evaporation, or reaction to a gaseous compound) from the printing process. Alternately or in addition, fused filament fabrication 102 may include or be in connection with a system that may provide a controlled fabrication temperature and atmosphere, and a filtration mechanism.

Figure 1C:
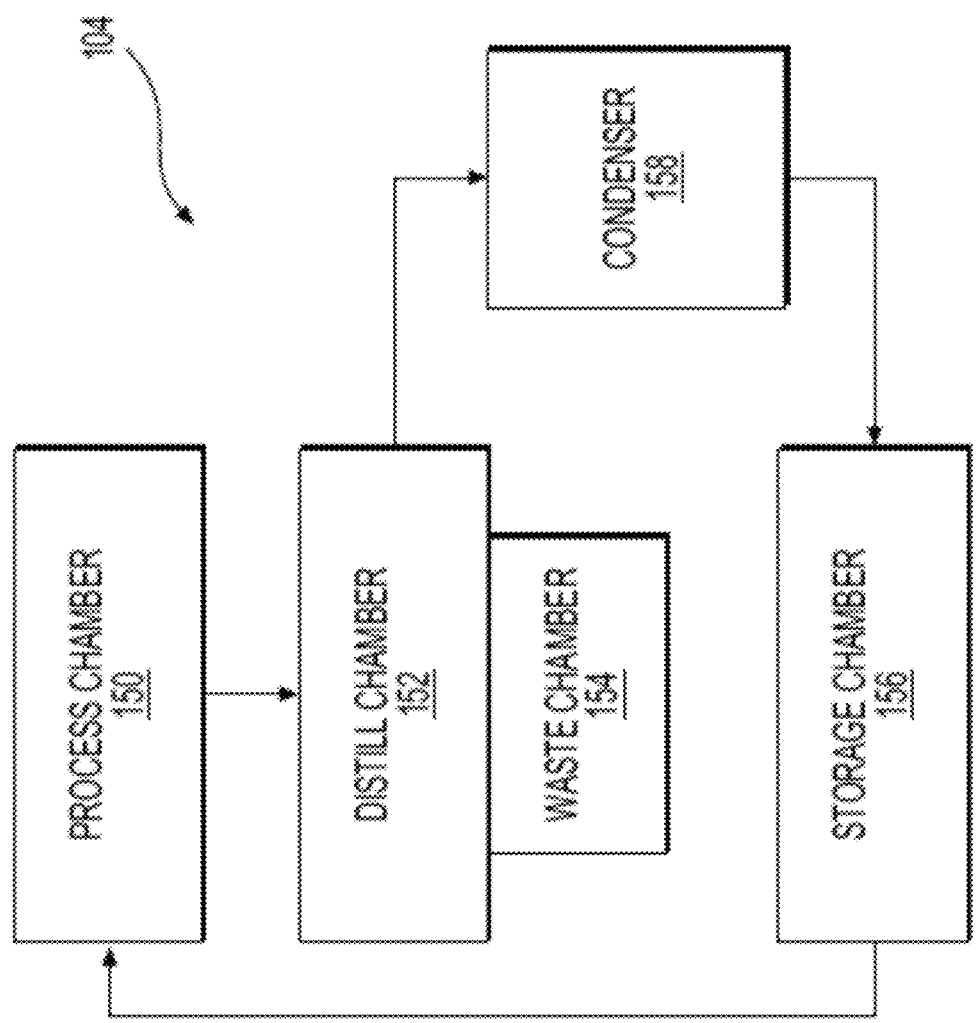
FIG. 1C is a block diagram of an illustrative debinding subsystem of the system of FIG. 1A, according to some embodiments.

FIG. 1C depicts a block diagram of a traditional chemical debinder subsystem 104 for debinding a green part 130. The chemical debinder subsystem 104 may include a process chamber 150, into which the green part 130 may be inserted for a first debinding process. The first debinding process may be a solvent debinding process that may be performed in a storage chamber containing debinding fluid, e.g., a solvent. The storage chamber 156 may comprise a port which may be used to fill, refill, and/or drain the storage chamber 156 with the debinding fluid. The storage chamber 156 may be removably attached to the debinder subsystem 104. For example, the storage chamber 156 may be removed and replaced with a replacement storage chamber (not shown in FIG. 1C) to replenish the debinding fluid in the debinding subsystem 104. The storage chamber 156 may be removed, refilled with debinding fluid, and reattached to the debinding subsystem 104. As discussed above, embodiments of the present disclosure may remove the need for a chemical debinder, and the primary binder may be removed via sublimation, as will be described further below. In such embodiments, all thermal processing, including removing of the primary binder through sublimation, removal of the secondary binder through vaporization, and sintering of the metal part, may occur in a furnace.

Figure 1D:
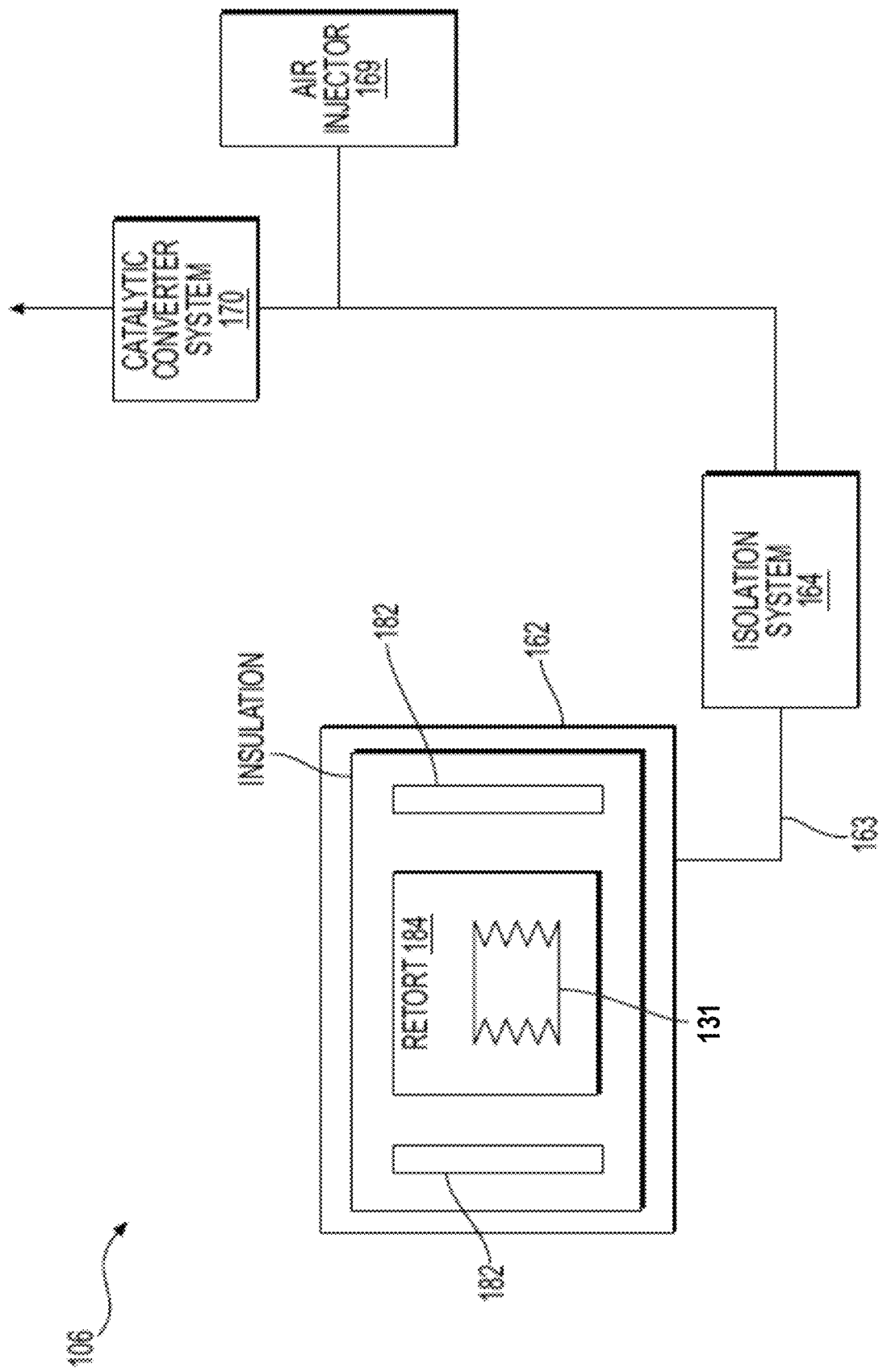
FIG. 1D is a block diagram of an illustrative furnace subsystem of the system of FIG. 1A, according to some embodiments.

FIG. 1D is a block diagram of the furnace subsystem 106 according to exemplary embodiments. The furnace subsystem 106 may include one or more of a furnace chamber 162, an isolation system 164, an air injector 169 (also referred to as an oxygen injector, which may introduce air or oxygen gas into the system), and a catalytic converter system 170.

The furnace chamber 162 may be a sealable and insulated chamber designed to enclose a controlled atmosphere. In some cases, the atmosphere in the chamber may be controlled to be substantially free of oxygen. In some embodiments, the atmosphere may be configured to be substantially free of oxygen to prevent combustion. In the context of the current disclosure, a controlled atmosphere refers to an atmosphere being controlled for at least composition and pressure. The atmosphere may be controlled to be substantially free of oxygen, in some embodiments the atmosphere is configured to be substantially free of oxygen to prevent combustion.

The furnace chamber 162 may include one or more heating elements 182 for heating chamber contents enclosed within the furnace chamber 162. As shown in FIG. 1D, the brown part 131 may be placed in the furnace chamber 162 for thermal processing. e.g., a thermal debinding process or a densifying process. In some embodiments, the furnace chamber 162 may be heated to a suitable temperature as part of the thermal debinding process in order to remove any binder components included in the brown part 131 and then may be heated to a sintering temperature to densify the part. The furnace chamber 162 may include a retort 184 with walls partially or fully enclosing the region where the brown part 131 is located. In some embodiments, the furnace chamber 162, specifically the retort 184, may include one or more shelves on which the green part 130 may be placed within the furnace chamber 162.

Gas may be introduced to the furnace chamber to affect the atmosphere surrounding the printed object during thermal processing as the brown part 131 is heated during a thermal processing, e.g., during the thermal debinding process. In some embodiments, some amount per time of the furnace atmosphere may be pumped out of the furnace chamber 162, flowed through the isolation system 164, and directed towards the catalyst converter system 170. The isolation system 164 may be configured to prevent downstream species, gas, or gas components (e.g., gas, particularly oxygen gas from air injector 169) from transporting back towards the furnace chamber 162. The isolation system 164 or catalytic converter system 170 may be configured to remove at least a portion of the toxic fumes, e.g., at least a portion of the volatilized binder components.

As noted above, the system of FIGS. 1A-1D represents a conventional system for additive fabrication that includes a solvent debinding step. The techniques described herein improve over such a system by eliminating the solvent debinding step and requiring only a thermal debinding step. The resulting system may be represented by FIG. 2A, which is a block diagram of an additive manufacturing system suitable for practicing embodiments of the present disclosure, according to some embodiments.

Figure 2A:
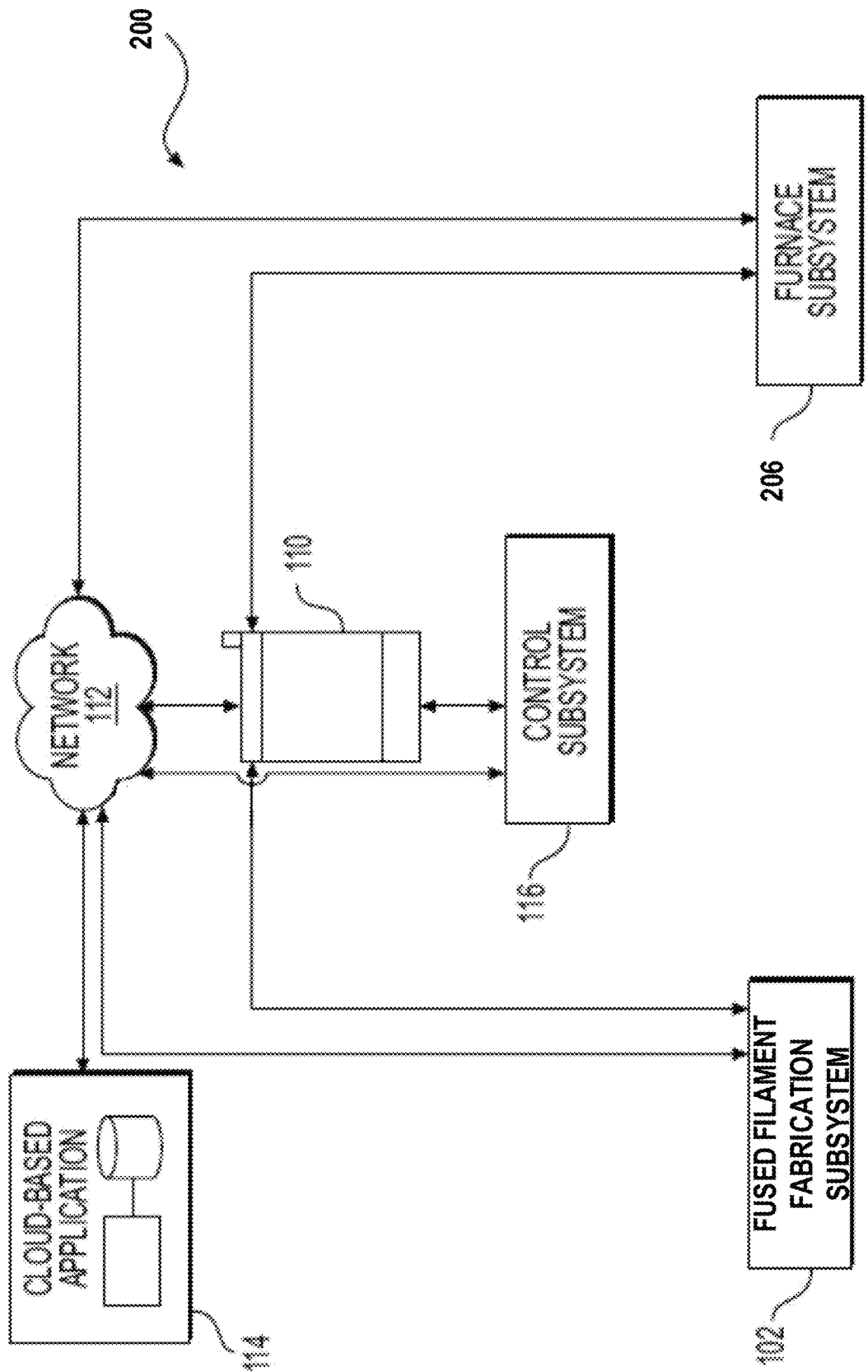
FIG. 2A is a block diagram of an additive manufacturing system according to some embodiments.

As may be seen in FIG. 2A, additive manufacturing system 200 includes components 102, 110, 112, 114 and 116 as shown in FIG. 1A and described above, but notably does not require debinding subsystem 104, rather only requiring a furnace subsystem 206 to be described below. In the example of FIG. 2A, the furnace subsystem 206 may be operated to debind the green part produced by fused filament fabrication subsystem 102 and to sinter the resulting brown part.

Figure 2B:
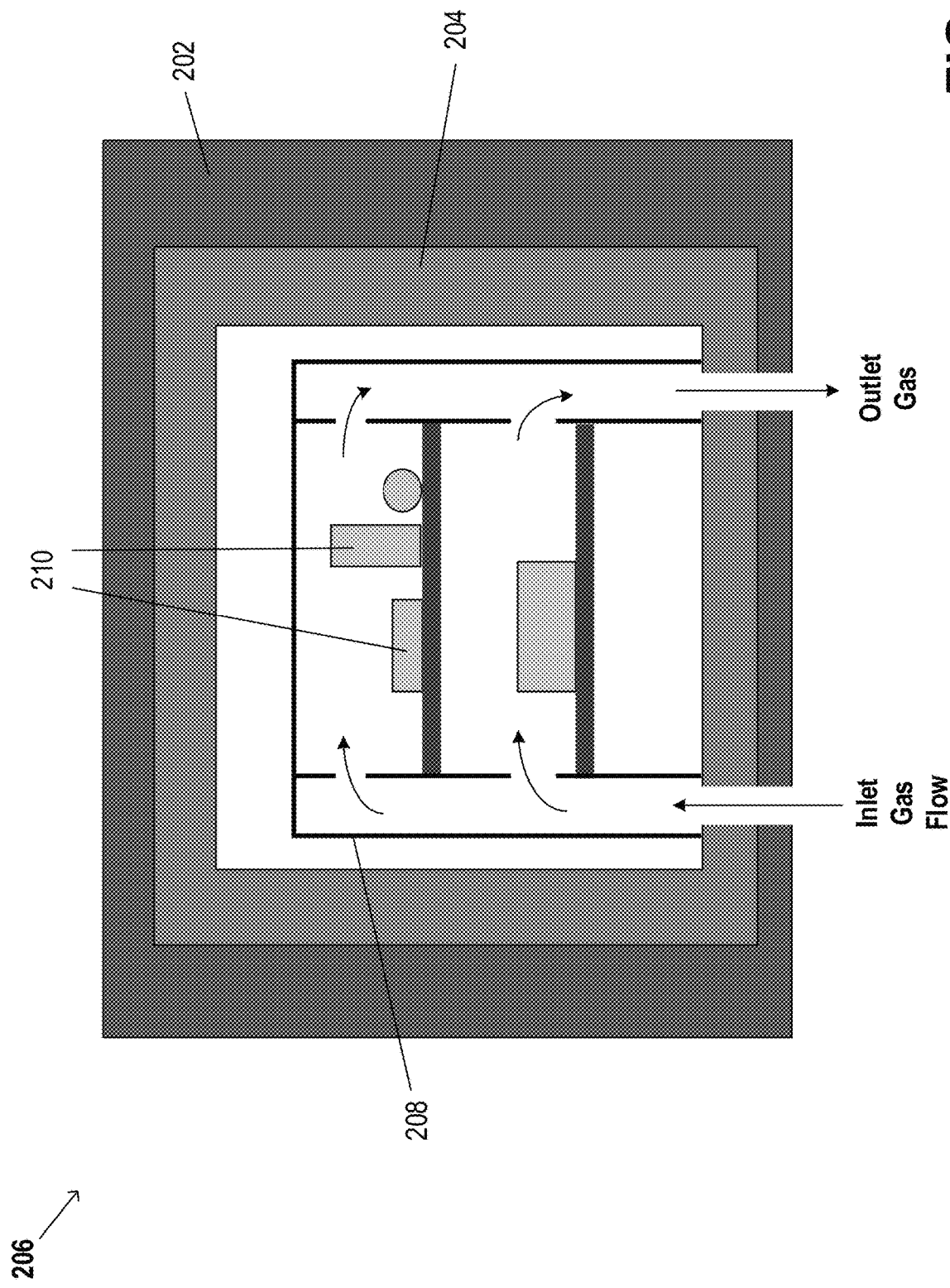
FIG. 2B depicts a cross-sectional view of a furnace subsystem of the system of FIG. 2A, according to some embodiments.

FIG. 2B depicts a cross-sectional view of the furnace subsystem 206 of FIG. 2A, according to some embodiments. As will be discussed further below, according to the techniques for thermal debinding described herein, proper control of pressure and gas flow through the furnace is important to properly remove the primary binder components. Furnace subsystem 206 is configured to heat green parts 210 while controlling the pressure within the furnace.

The furnace 206 comprises a vacuum (or other isolating) chamber 202 separating the surrounding atmosphere from regions interior to the chamber, a thickness of high temperature insulation 204, and a series of heating elements (not shown for clarity), that may exist on several sides of the retort 208 which sits interior to the aforementioned elements. As shown, the retort may contain a series of shelves to support the parts 210 and the retort may be further configured with an integrated (or separate) gas flow manifold to distribute sweep gas across the objects to be sintered.

After the gas has interacted with the objects, a downstream manifold may be configured to collect and remove the gas through an outlet toward a pump or other similar mechanism. Various apparatus upstream or downstream of the inlet and outlet manifolds may be employed to control the flow and pressure of gaseous species into and out of the furnace chamber. For instance, one or more pumps (e.g., pressure pumps, vacuum pumps) may be operated coupled to the inlet and/or outlet to control the pressure within the chamber of the furnace 206.

Furnace 206 may be configured for use with a primary binder component that may be converted to a gas through evaporation, sublimation, or other means, to be described further below. For example, the furnace may be capable of achieving the temperature and pressure conditions to sublimate and/or vaporize primary and secondary binders within a part. The furnace may comprise a flow line or in-line heating element configured at a temperature above which the sublimed component may be converted, combusted, reacted, or pyrolized to a material which can be exhausted through the pump or reacted by the catalytic converter and exhausted. For example, the furnace may, at least, be capable of achieving and sustaining vacuum conditions (e.g., $10^{-4}$ to 10 Torr, as low as 0.2 Torr, or a range including at least about 5 to 10 Torr, but perhaps as high as 300 Torr or 2200 Torr) and in some embodiments, temperature ranges of approximately 25° C.-1400° C. (as may be used in the sintering of ferrous metals, for example), and a range of approximately 25° C.-2800° C. (as may be used in the sintering of ceramics and carbides, for example) in other embodiments. The temperature ranges may also include ranges suitable for sintering the metal ceramic powder. For example a peak temperature of 800-1200° C. may be used for Cu, Ag, Au, or other metals, alloys, and ceramics with a melting temperature in this range. A peak temperature of 1200-1400° C. may be used for ferrous, Ni-based, or Ti-based metals and alloys. A peak temperature of 1400-1600° C. may be used for some carbides or ceramics.

The furnace 206 may further be configured to manage gaseous effluent from the binder(s) or other byproducts of the thermal debinding process to avoid contamination of the parts. This may be achieved, e.g., by allowing for the use of sweep gas, including one or more getters (e.g., activated charcoal, or metal powders, flakes, turnings, chips, or granules of a material with a high affinity for oxygen), including a catalytic converter, or any suitable structure or combination of structures available to manage effluent. The effluent may be captured as positions distal to the retort and furnace chamber. In another embodiment, the sublimed material may be converted, pyrolized, or otherwise reacted by passing the effluent through an assembly of high temperature elements in such a manner that the effluent is brought to intimate and direct contact with the high temperature elements; in some embodiments, the elements may be held at a temperature between 200° C. and 500° C. In other embodiments, the elements may be held at a temperature between 400 and 800° C. Once the effluent has passed through the assembly of high temperature elements, the sublimed material is substantially converted to gaseous constituents or inert solids which can be managed by a catalytic converter, pumping system, or the like. Further, the furnace may include pressure or temperature gauges to monitor the status of thermal processing, including thermal debinding and/or sintering. The furnace subsystem 206 described in connection to FIG. 3 may include one or more of these described features.

Figure 3:
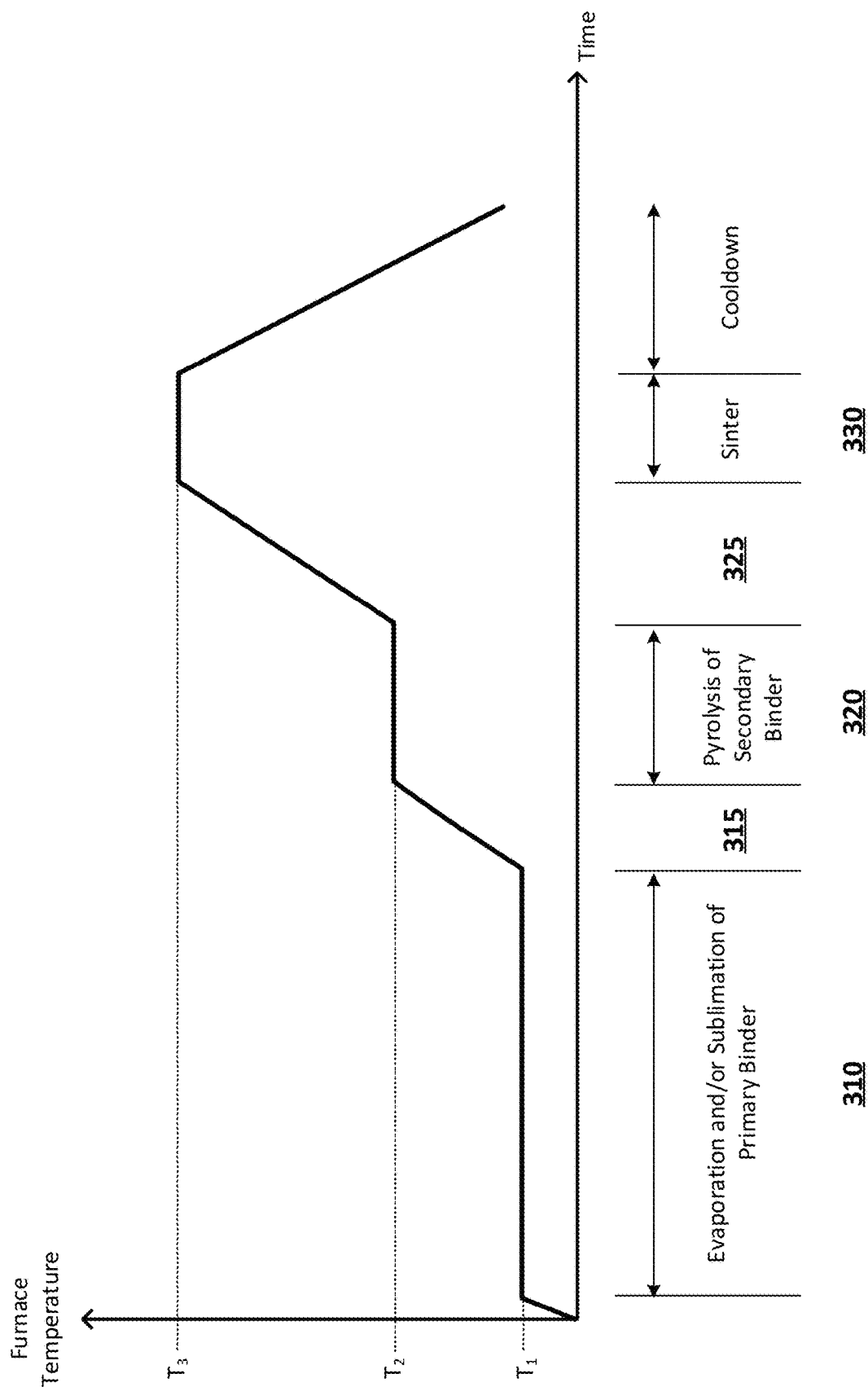
FIG. 3 depicts a chart showing a schedule of furnace temperature over time during a thermal treatment process, according to some embodiments.

To further describe how the furnace 206 may be operated to thermally debind and sinter a green part, FIG. 3 depicts a chart showing the furnace temperature over time, according to some embodiments. As discussed above, techniques described herein allow for thermal debinding without causing the build material within a part to flow. This result may be produced by the process depicted in FIG. 3 coupled with a suitable binder within the build material. Both the process and materials are described in further detail below, although it is assumed within FIG. 3 that the parts contain a primary binder component, a secondary binder component, and at least some other material such as metal or ceramic.

In the example of FIG. 3, the furnace initially is heated to a first temperature $T_1$. In the subsequent discussion, when the temperature of the furnace is referenced, this refers to the temperature at which the furnace is being operated, which is not necessarily the temperature of the parts within the furnace at the same time. Subsequent to heating the furnace to temperature $T_1$, the furnace is held at this temperature for some period of time to allow the primary binder component to be removed from the parts through sublimation and/or evaporation of the primary binder. This period is labeled as stage 310 in FIG. 3.

The temperature $T_1$ may be selected in the following manner. First, it is desirable that $T_1$ is below the deposition temperature during fabrication of the green part. If $T_1$ were at or above this temperature, this may cause the material to flow in a manner similar to that during fabrication, which would lead to deformation of the part. In addition, it is desirable that $T_1$ is below the melting point of a second binder component, otherwise the part would become more mobile due to melting of the secondary binder. During stage 310, the pressure within the furnace may be held at a low pressure to aid in removal of the primary binder from the parts.

During the process of FIG. 3, the furnace may be operated to remove the primary binder component by setting the furnace conditions (e.g., pressure and temperature) to desired conditions of the primary binder (e.g., conditions at which sublimation of the primary binder may occur, at a sublimation rate that is steady but not too slow). For instance, to remove the primary binder from the part via sublimation, the furnace may be set to a temperature below the melting point of the primary binder (e.g., approximately 60° C.) and to a pressure (e.g., less than approximately 5 to 10 torr) suitable to cause sublimation of the primary binder. The temperature (or temperature range) for removing the primary binder may be a temperature below the melting point of the primary binder (e.g., the primary binder's melting point when isolated at standard ambient temperature and pressure). Such conditions may in at least some cases avoid a phase change of the primary binder from solid to liquid, and may instead cause a phase change directly from solid to gas. Once the primary binder is exposed to the desired conditions, the primary binder may sublimate and evacuate from the part. In other words, the solid primary binder may change phase directly from a solid to a gas (sublimate) when exposed to the appropriate sublimation conditions. In subliming, the solid primary binder may escape from the green part. In some embodiments, the pressure within the furnace may refer to the partial pressure of the sublimed species, rather than the overall system pressure.

According to some embodiments, $T_1$ may be equal to or greater than 50° C., 60° C., 70° C., 80° C., 90° C., 100° C., 110° C., 120° C., 130° C., 140° C., or 150° C. According to some embodiments, $T_1$ may be less than or equal to 160° C., 150° C., 140° C., 130° C., 120° C., 110° C., 100° C., 90° C., 80° C., 70° C., or 60° C. Any suitable combinations of the above-referenced ranges are also possible (e.g., $T_1$ of greater or equal to 50° C. and less than or equal to 100° C.).

According to some embodiments, the time for which the furnace is held at temperature $T_1$ may be equal to or greater than 1 hour, 3 hours, 4 hours, 5 hours, 24 hours, 48 hours, 72 hours, or 200 hours. According to some embodiments, the time for which the furnace is held at temperature $T_1$ may be less than or equal to 300 hours, 80 hours, 60 hours, 30 hours, 15 hours, 10 hours, 5 hours, or 2 hours. Any suitable combinations of the above-referenced ranges are also possible (e.g., a time of greater or equal to 10 hours and less than or equal to 60 hours).

According to some embodiments, the pressure within the furnace during stage 310 may be equal to or greater than 1 Torr, 2 Torr, 3 Torr, 5 Torr, 7 Torr, 10 Torr or 15 Torr. According to some embodiments, the pressure within the furnace during stage 310 may be less than or equal to 20 Torr, 15 Torr, 10 Torr, 8 Torr, 5 Torr, or 3 Torr. Any suitable combinations of the above-referenced ranges are also possible (e.g., a pressure of greater than or equal to 2 Torr and less than or equal to 8 Torr).

By the end of stage 310, most or all of the primary binder is removed from the parts. Subsequent to stage 310 the furnace is heated to a second temperature $T_2$, which is higher than $T_1$, during a ramp period 315. In some embodiments, some of the primary binder may be removed during the period of temperature increase between $T_1$ and $T_2$. Subsequent to heating the furnace to temperature $T_2$, the furnace is held at this temperature for some period of time to allow the secondary binder component to be removed from the parts. This period is labeled as stage 320 in FIG. 3 In stage 320, the secondary binder may be removed through various processes that result in a gas being released or evolved from the parts. The gas may include the gaseous form of the secondary binder and/or may include any other gaseous materials produced through, or aided by, heating of the secondary binder. Stage 320 may include conversion to a gas of the secondary binder, and may include processes such as pyrolysis of the secondary binder.

The temperature $T_2$ may be selected in the following manner. First, it is typically desirable that $T_2$ is above the melting point of the secondary binder component to effectively remove the secondary binder (e.g., the melting point of the secondary binder when isolated at standard ambient temperature and pressure). In some embodiments, however, the secondary binder components may not display an obvious melting point or may otherwise have become modified (such as by crosslinking, for example) during the deposition step such that a melting point is no longer clear or applicable. More generally, the temperature $T_2$ may be determined by the examination of mass loss curves from a thermogravimetric analysis or other related techniques. In the case of thermogravimetric analysis, the mass of a sample of the build material or the isolated secondary binder is exposed to increasing temperature while the mass of the sample is monitored. The temperature $T_2$ may be identified as the temperature at which the mass loss of the secondary binder commences. As the rate of mass loss may be a process variable or constraint, the temperature $T_2$ can be selected based upon the desired rate of mass loss. Further, the rate of mass loss of the secondary binder and the temperature at which the mass loss of the secondary binder commences may depend upon the process gas pressure, the process gas flow, and/or the process gas species. By way of example, the temperature $T_2$ may be lower when hydrogen is used as the process gas vs. argon. During stage 320, the pressure within the furnace may be held at a low pressure to aid in removal of the secondary binder (or gas produced through conversion of the secondary binder) from the parts.

According to some embodiments, $T_2$ may be equal to or greater than 200° C., 250° C., 300° C., 350° C., 400° C., 450° C., or 500° C. According to some embodiments, $T_2$ may be less than or equal to 600° C., 500° C., 400° C., 350° C., 300° C., 250° C., or 200° C. Any suitable combinations of the above-referenced ranges are also possible (e.g., $T_2$ of greater or equal to 250° C. and less than or equal to 500° C.).

According to some embodiments, the time for which the furnace is held at temperature $T_2$ may be equal to or greater than 1 hour, 2 hours, 3 hours, 4 hours, 5 hours, 6 hours, 7 hours, or 8 hours. According to some embodiments, the time for which the furnace is held at temperature $T_2$ may be less than or equal to 8 hours, 7 hours, 6 hours, 5 hours, 4 hours, 3 hours, 2 hours, or 1 hour. Any suitable combinations of the above-referenced ranges are also possible (e.g., a time of greater or equal to 2 hours and less than or equal to 3 hours).

According to some embodiments, the pressure within the furnace during stage 320 may be equal to or greater than 1 Torr, 2 Torr, 3 Torr, 5 Torr, 7 Torr, 10 Torr or 15 Torr. According to some embodiments, the pressure within the furnace during stage 320 may be less than or equal to 20 Torr, 15 Torr, 10 Torr, 8 Torr, 5 Torr, or 3 Torr. Further embodiments may exist where the pressure within the furnace during stage 320 may be equal to or greater than 50 Torr, 100 Torr, or 300 Torr. According to other further embodiments, the pressure within the furnace during stage 320 may be less than or equal to 375 Torr, 175 Torr, or 75 Torr. Any suitable combinations of the above-referenced ranges are also possible (e.g., a pressure of greater than or equal to 2 Torr and less than or equal to 8 Torr).

By the end of stage 320, most or all of the secondary binder is removed from the parts. Subsequent to stage 320 the furnace is heated to a third temperature $T_3$, which is higher than $T_2$, during a ramp period 325. In stage 300, the furnace is held at temperature $T_3$, which is selected to sinter metal within the parts, the process of which is described above in relation to FIG. 1D.

According to some embodiments, $T_3$ may be equal to or greater than 400° C., 600° C., 800° C., 1000° C., 1200° C., or 1400° C. According to some embodiments, $T_3$ may be less than or equal to 1500° C., 1200° C., 1000° C., 800° C., 600° C., or 400° C. Any suitable combinations of the above-referenced ranges are also possible (e.g., $T_3$ of greater or equal to 800° C. and less than or equal to 1500° C.). In further embodiments, typically, but not always, applicable for parts containing refractory materials (including but not limited to refractory metals, ceramics, carbides and the like), $T_3$ may be equal to or greater than 1500° C., 1800° C., 2000° C., or 2500° C. According to these further embodiments, $T_3$ may be less than or equal to 2100° C., 1900° C., or 1600° C. Any suitable combinations of any of the above-referenced ranges are also possible (e.g., $T_3$ of greater or equal to 800° C. and less than or equal to 1500° C.).

According to some embodiments, the pressure within the furnace during stage 330 may be equal to or greater than 0.05 Torr, 1 Torr, 10 Torr, or 20 Torr. According to some embodiments, the pressure within the furnace during stage 330 may be less than 30 Torr, 20 Torr, 10 Torr or 1 Torr. In other embodiments, the pressure within the furnace during stage 330 may be equal to or greater than 50 Torr, 250 Torr, 300 Torr, 600 Torr, 700 Torr, or 1000 Torr. According to some embodiments, the pressure within the furnace during stage 320 may be less than or equal to 1100 Torr, 800 Torr, 700 Torr, 400 Torr, 350 Torr, or 100 Torr. Any suitable combinations of the above-referenced ranges are also possible (e.g., a pressure of greater than or equal to 0.05 Torr and less than or equal to 10 Torr).

According to some embodiments, the rate of the temperature increase during each of the ramp periods 315 and 325 may be equal to or greater than an 0.1° C./min, 0.25° C./min, 0.5° C./min, 1° C./min, 2° C./min, or 5° C./min. According to some embodiments, the speed of the temperature increase during each of the ramp periods 315 and 325 may be less than or equal to 5° C./min, 2° C./min, 1° C./min, 0.5° C./min, 0.25° C./min, or 0.1° C./min. Any suitable combinations of the above-referenced ranges are also possible (e.g., a temperature increase at a rate that is equal to or greater than 2° C./min and less than or equal to 5° C./min). In some embodiments the rate of temperature increase may be 3° C./min. It will be appreciated that the rate of temperature increase as referred to above may be defined as the change in the desired temperature within the furnace during the thermal process, and the actual rate of temperature increase (or change) may vary depending upon the location within the furnace and with the sizes, geometries, and types of objects (including parts) placed within the furnace. Further, the indicated temperatures and temperature ranges in FIG. 3 may be considered to be desired temperatures within the furnace, whereas in practice the actual temperatures realized within the furnace may vary depending upon the position with the furnace and with the sizes, geometries, and types of objects (including parts) placed within the furnace.

It will be also appreciated that the schematic temperature over time chart of FIG. 3 is provided as an illustrative example and that the exact temperature profile over time may not be as simplistic as shown in FIG. 3. For instance, the temperature holds stages may vary over a few degrees, the sintering stage may not include a temperature hold for a significant period of time, there may be additional temperature ramps and holds at higher or lower temperatures than shown, etc.

In terms of the behavior of a part within the furnace operated as shown in FIG. 3, the process of FIG. 3 proceeds in the following manner. At lower temperatures, the viscosity of a part is extremely large (or even infinite or otherwise undefined) and the material is essentially a solid. As the temperature increases, softening of the parts may occur concurrent with viscous flow. The temperature at which this happens depends on the material properties of the binder components. If the secondary binder begins to soften when the primary binder component is still present in the parts, this may cause the parts to flow at too low a temperature, leading to deformation of the parts. Alternatively, if the primary binder is selected to be removable at suitably low temperatures, the onset of material softening may be delayed by the removal of the primary binder. That is, upon the removal of the primary binder the material may no longer display softening at a specific temperature versus the case where the primary binder is present and the material is brought at or above the same specific temperature. If the primary binder is properly and sufficiently removed prior to the softening onset, the resistance to flow will remain high and the driving force for deformation will be insufficient to produce substantial deformation. Furthermore, as the temperature is increased through segment 315, the viscosity will continue to drop and removal of the remaining binder with proceed. Despite the decrease in the viscosity of the remaining binder in the part, removal of the primary binder prevents lubricated motion between the powder particles provided that the concentration of the powder particles is sufficiently large and the particles themselves will mechanically arrest and support one another to mitigate motion driven by gravity or other forces acting on the part. Further, as the binder components are removed the part converts to a powder-only structure rather than a powder structure infused with binder components.

Figure 4A:
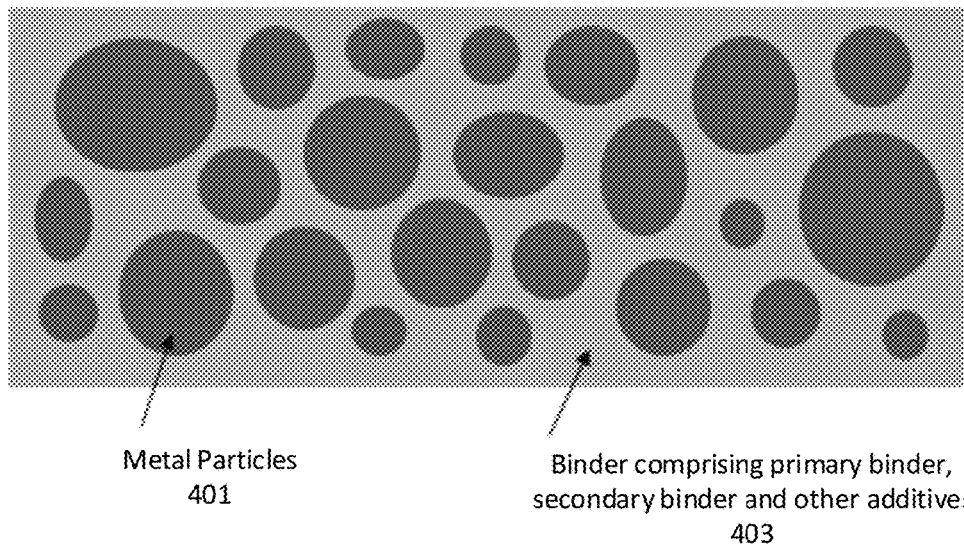
FIG. 4A shows a schematic of an exemplary magnified section of a fabricated part formed of a feedstock comprising metal powder.
Figure 4B:
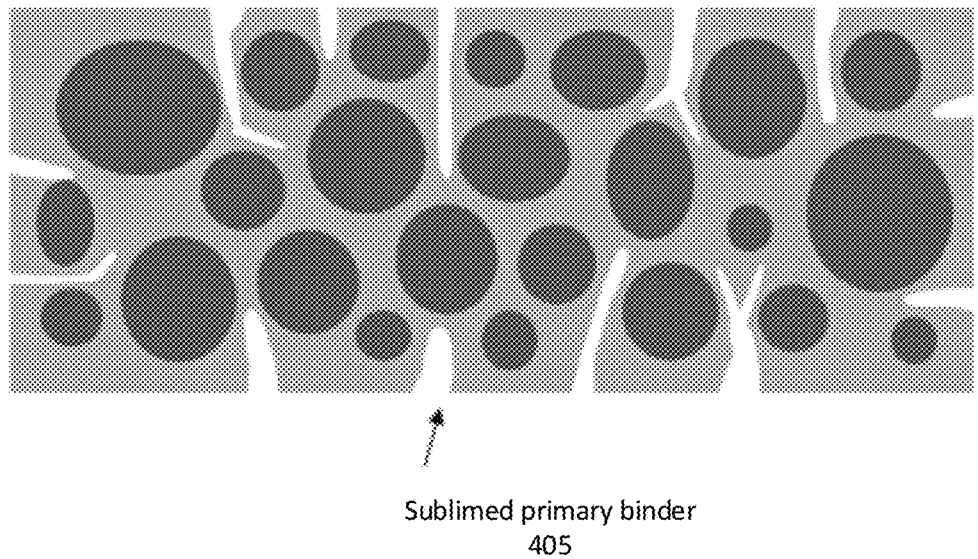
FIG. 4B shows a schematic of the exemplary fabricated part of FIG. 4A undergoing thermal debinding.

To depict aspects of this process at a small scale, FIGS. 4A and 4B depict the material within a green part before and after removal of a primary binder component, respectively, according to some embodiments. In the example of FIGS. 4A and 4B, the part comprises particles (which may be metallic or another material, as described elsewhere in this description) 401 and a binder 403, which includes a primary binder that can sublime, evaporate, or convert to gas at a temperature low as compared to the deposition temperature, a secondary binder that is removed at a higher temperature, and other additives such as one or more tackifiers, wetting agents, antioxidants, plasticizers and/or surfactants.

As discussed above, the primary binder may be removed by pure thermal means, e.g., by heating the printed part in a furnace at a temperature $T_1$ and low or vacuum pressure. This process of conversion of the primary binder to a gaseous species results in the complete or near complete removal of the primary binder, and may further create a network of connected pores in the printed part, as shown in FIG. 4B by channels 405. The remaining secondary binder may then be removed through thermal debinding at a higher temperature and partial pressure, as described above.

The separation of primary binder removal and build material softening temperatures may be very important to the performance of the material in thermal debinding of the object via the process described above. Additionally, the feedstock is desired to be highly loaded (in regard to the volume fraction of powder) which may aid in maintaining the mechanical stability of the printed object during thermal processing, to debind in a reasonable time (e.g., on the order of hours for parts with greater than 20 mm thickness), the feedstock should ideally print objects with excellent feature fidelity and good adhesion. A further benefit of the high loading is to reduce the total amount of linear and volumetric shrinkage that will present as shrinkage during sintering.

Figure 5A:
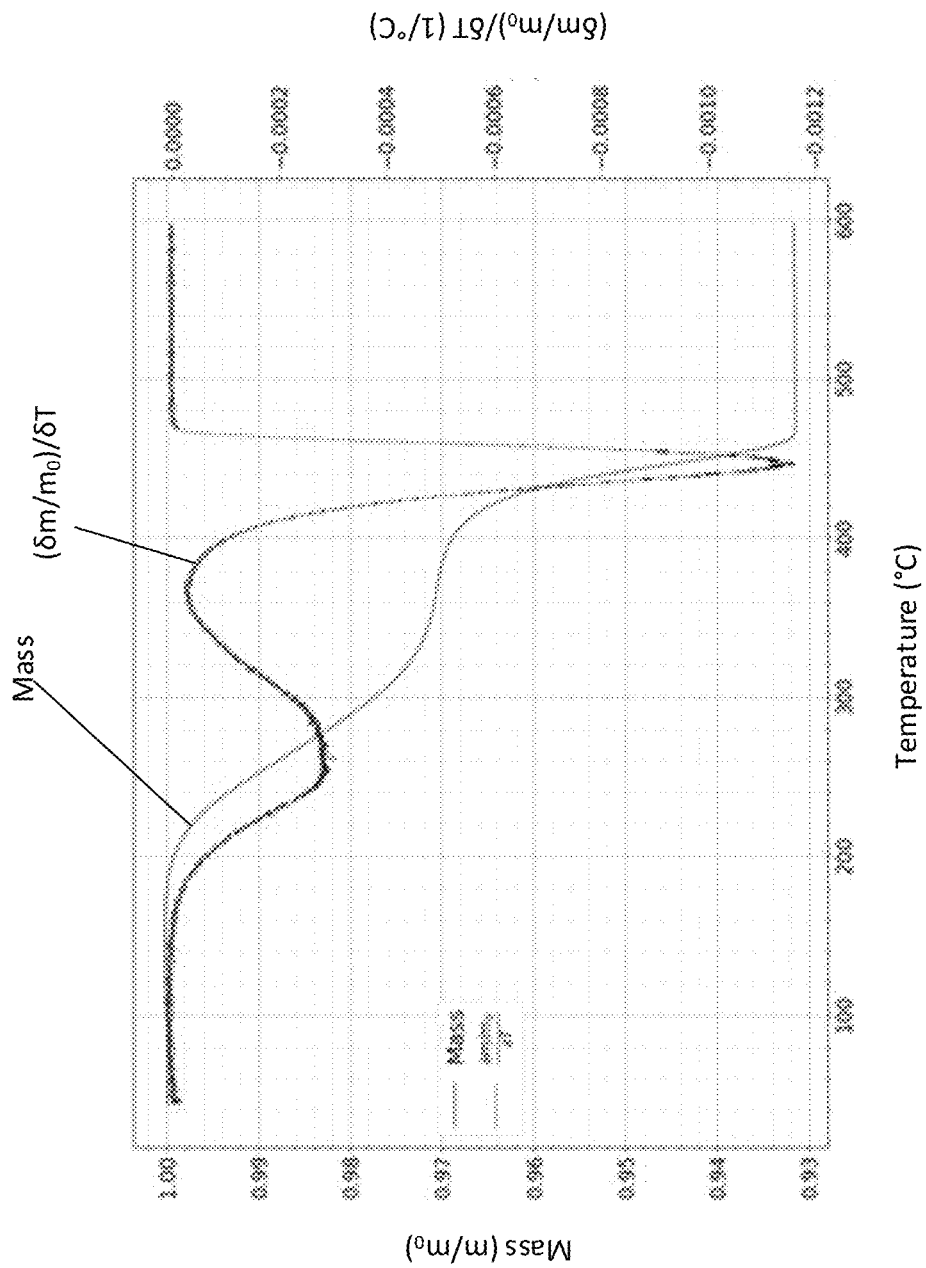
FIGS. 5A-5B illustrate thermogravimetric analyses of a conventional feedstock, according to some embodiments.
Figure 5B:
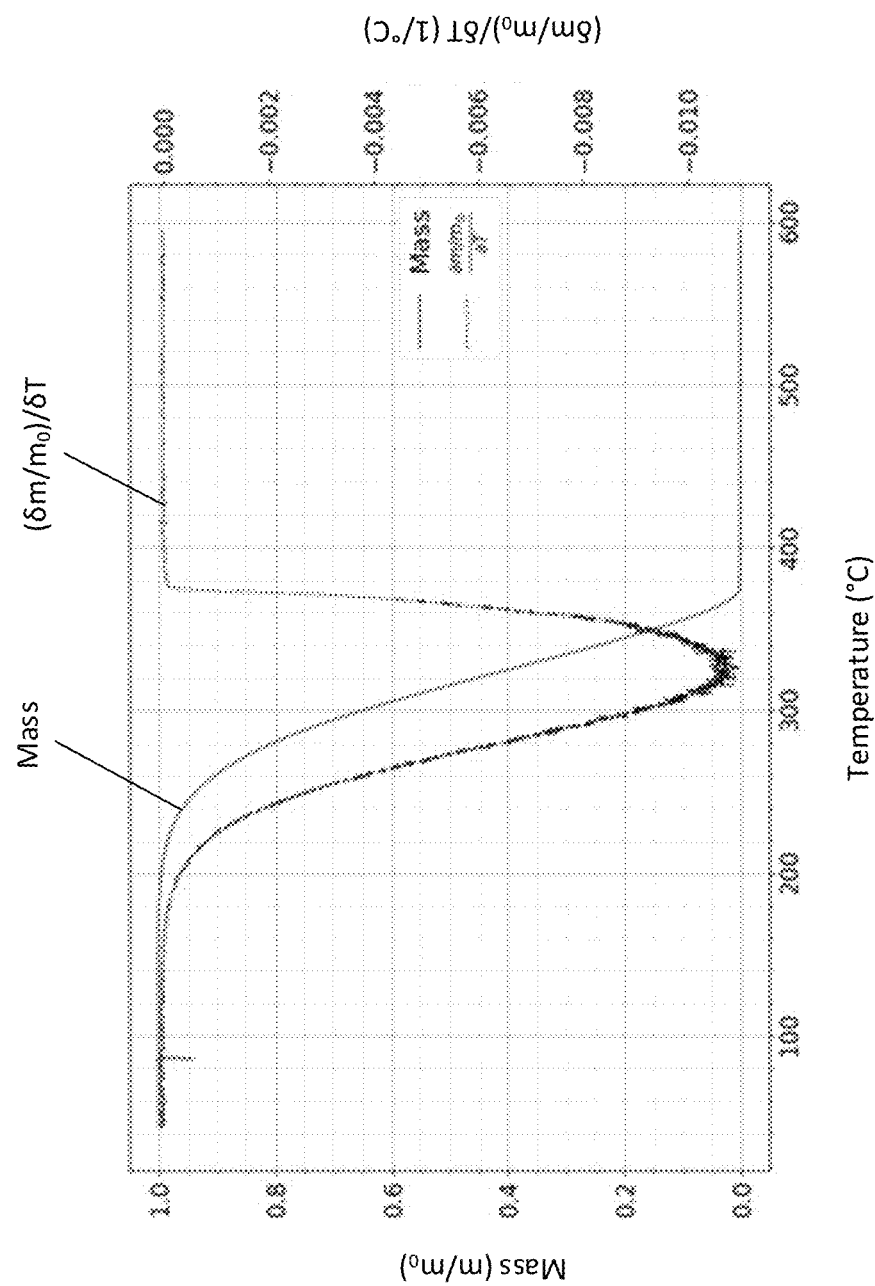

Conventional binder chemistries in feedstock are both improperly formulated and improperly processed to achieve these objectives. To illustrate further, FIG. 5A depicts a thermogravimetric (TGA) analysis of a conventional feedback, according to some embodiments. The TGA analysis indicates the mass of a sample over time as the temperature of the sample changes. As may be seen in FIG. 5A, the mass is represented as a fraction of the initial mass with a solid light gray curve (left axis), and the rate of change of the mass over time is represented by the darker, dotted curve (right axis). These data indicate a near continuous rate of mass loss for both the primary (first loss at around 260° C.) and secondary (second loss at around 450° C.) components of the binder formulation. Further, the temperature window over which mass loss occurs for the primary binder (at least in the range from 190° C. to 390° C.), overlaps or exceeds the softening temperature of the feedstock itself—which leads to excessive feedstock flow and deformation. For instance, the conventional feedstock shown may be deposited at around 100° C. during fabrication of a green part using fused filament deposition, yet it is necessary to heat the feedstock to well over this temperature to remove the primary binder through heating. For at least this reason, such a feedback is conventionally removed via non-thermal means such as solvent debinding. This result may be understood in terms of a TGA analysis of the primary binder in the conventional feedstock of FIG. 5A, which is a paraffin wax. A TGA analysis of the paraffin wax is shown in FIG. 5B, which shows that there is no significant reduction in mass of the paraffin wax sample until the sample is heated above around 200° C.

The inventors have recognized and appreciated that desirable primary binder components for a build material to be debound via thermal-only debinding processes as described herein may include organic molecules that are slightly polar. The primary binder may be an organic molecule that has a chain length that results in a melting point and vapor pressure low enough to allow heating of the primary binder to cause evaporation and/or sublimation of the primary binder at temperatures below the deposition temperature of the build material during fabrication, while being high enough that the primary binder is solid at room temperature.

Vapor pressures of various polar and non-polar compounds over a range of temperatures, are referred to herein, may for instance be determined according to a reference such as the "The Yaws Handbook of Vapor Pressure," Carl L. Yaws, Gulf Professional Publishing, 2015, which is hereby incorporated by reference in its entirety.

According to some embodiments, a build material may include at least one metal powder and/or at least one ceramic powder in addition to a binder. The binder may comprise a primary binder component and a secondary binder component, wherein the primary binder component comprises a hydrophobic moiety and a hydrophilic moiety. In some cases, the hydrophilic moiety may be a hydrogen bonding moiety, such as a hydrogen bond donor and/or a hydrogen bond acceptor. In some embodiments, the primary binder component may be an alcohol, a carboxylic acid, or an amine. In cases where the primary binder is an alcohol, it may be a fatty alcohol such as octadecanol (e.g., 1-octadecanol, a.k.a. stearyl alcohol), lauryl alcohol, myristyl alcohol, cetyl alcohol, or oleyl alcohol. The hydrophobic moiety may be saturated or unsaturated.

According to some embodiments, the primary binder component may be an unsaturated olefin. According to some embodiments, the primary binder component may have a single degree of saturation along the chain. According to some embodiments, the primary binder component may have more than one degree of saturation along the chain. According to some embodiments, the primary binder component may be an aliphatic alcohol with the alpha carbon is at the end of the chain. According to some embodiments, the primary binder component may be an aliphatic alcohol with the alpha carbon residing at a position other than the ends of the chain. According to some embodiments, the primary binder component may be a long chain acidic olefin, an ester form of acidic olefins, or a terpene such as thymol.

According to some embodiments, the hydrophobic moiety of the primary binder component may be a substituted or unsubstituted aliphatic chain of at least 10 carbon atoms, 12 carbon atoms, 14 carbon atoms, 16 carbon atoms, 18 carbon atoms, or 20 carbon atoms. According to some embodiments, the hydrophobic moiety of the primary binder component may be a substituted or unsubstituted aliphatic chain of no more than 22 carbon atoms, 20 carbon atoms, 18 carbon atoms, 16 carbon atoms, 14 carbon atoms, or 12 carbon atoms. Any suitable combinations of the above-referenced ranges are also possible (e.g., the hydrophobic moiety of the primary binder component may be a substituted or unsubstituted aliphatic chain of at least 18 carbon atoms and no more than 22 carbon atoms).

According to some embodiments, a build material may include at least one metal powder and/or at least one ceramic powder in addition to a binder. The binder may comprise a primary binder component and a secondary binder component. In some embodiments, the primary binder component constitutes an amount by volume of the total binder (its vol %) that is equal to or greater than 15%, 25%, 30%, 35%, 40%, 45%, or 55%. In some embodiments, the primary binder component constitutes an amount by volume of the total binder that is less than or equal to 60%, 50%, 45%, 40%, 35%, 30%, or 25%. Any suitable combinations of the above-referenced ranges are also possible (e.g., the primary binder component constitutes at least 30% by volume and no more than 40% by volume of the binder).

In some embodiments, the primary binder component has a melting point at atmospheric pressure that is equal to or greater than 30° C., 35° C., 40° C., 45° C., 50° C., 55° C., 60° C., 65° C., 70° C., 75° C., 80° C., 85° C., or 90° C. In some embodiments, the primary binder component has a melting point at atmospheric pressure that is less than or equal to 90° C., 85° C., 80° C., 75° C., 70° C., 65° C., 60° C., 55° C., 50° C., 45° C., 40° C., 35° C., or 30° C. Any suitable combinations of the above-referenced ranges are also possible (e.g., the primary binder component has a melting point at atmospheric pressure that is equal to or greater than 50° C. and less than or equal to 65° C.). Any references to the melting point of a binder component herein refer to the melting point of that material at standard pressure (e.g., 1 atmosphere).

In some embodiments, the primary binder component has a vapor pressure of 10 Torr when the primary binder component is at a temperature that is equal to or greater than 150° C., 160° C., 170° C., 180° C., 190° C., 200° C., 210° C., or 220° C. In some embodiments, the primary binder component has a vapor pressure of 10 Torr when the primary binder component is at a temperature that is less than or equal to 220° C., 210° C., 200° C., 190° C., 180° C., 170° C., 160° C., or 150° C. Any suitable combinations of the above-referenced ranges are also possible (e.g., the primary binder component has a vapor pressure of 10 Torr when the primary binder component is at a temperature that is equal to or greater than 190° C. and less than or equal to 210° C.).

In some embodiments, the primary binder component has a vapor pressure that is equal to or greater than 0.01 Torr, 0.02 Torr, 0.05 Torr, 0.10 Torr, 0.20 Torr, 0.50 Torr, or 1 Torr when the primary binder component is at any temperature in the range 50° C. to 160° C., inclusive (for instance, the vapor pressure of the primary binder component may be equal to or greater than 0.05 Torr when the primary binder component is at 50° C., 51° C., 52° C., . . . , or 160° C.). In some embodiments, the primary binder component has a vapor pressure that is less than or equal to 2 Torr, 1 Torr, 0.75 Torr, 0.50 Torr, 0.25 Torr, 0.10 Torr, or 0.05 Torr when the primary binder component is at any temperature in the range 50° C. to 160° C., inclusive. Any suitable combinations of the above-referenced ranges are also possible (e.g., the primary binder component has, at all temperatures between 50° C. and 160° C., inclusive, a vapor pressure that is equal to or greater than 0.05 Torr and less than or equal to 1 Torr).

Further illustrative primary binder components may include Camphor, Naphthalene, Durene (1,2,4,5-tetramethylbenzene), N-phenylurethane, vanillin, dimethyl vanillin, stearyl alcohol, docosanol (behenyl alcohol), Resorcinol, Phenylacetic acid, Palmitic Acid, Dianhydro-D-glucitol, Stearic acid, Docosane, Eicosane, Octadecane, 1-docosanol, 1-eicosanol, 1-octadecanol, n-docosanol, n-eicosanol, n-octadecanol, and thymol.

According to some embodiments, a binder may comprise multiple different primary binder components. These multiple primary binders may be selected such that one or more primary binder components exhibit a vapor pressure at the primary debind temperature $T_1$ that is high (or low) compared to at least one other primary binder component in the binder. Practically, a combination of such binder components may provide for a primary binder with a high vapor pressure. Materials with high vapor pressure may depart the feedstock while the feedstock is in storage (that is prior to the deposition of a part), irreparably and perhaps adversely affecting the chemistry and flow properties of the feedstock.

Moreover, the inventors recognize that it may be desirable to remove multiple primary binder components in a stepwise manner such that the removal or loss of primary binder from the part is staggered. Such a staggered removal of primary binder components may be advantageous for several reasons. Firstly, the staggered removal of material may reduce the rate at which the primary binder is evolved from the material in gaseous form, which may be desirable for reasons relating to the maximum gas load that may be imposed upon the vacuum or pumping system within the furnace. Secondly, the staggered removal of material may permit a more aggressive rate of removal of each individual component. Since stresses may be generated within the part resulting from the rate of generation of gaseous species and the resistance to flow of these species through various sections, thicknesses, and components of the part, it may be desired to reduce the rate of generation for the first individual or set of primary binders followed by a more rapid removal of a second set or individual primary binder. The more rapid removal of the second set or individual primary binder may be facilitated by the removal of the early stage primary binder or binders creating open porosity and reducing the resistance to flow and therefore stresses within the object.

Figure 6A:
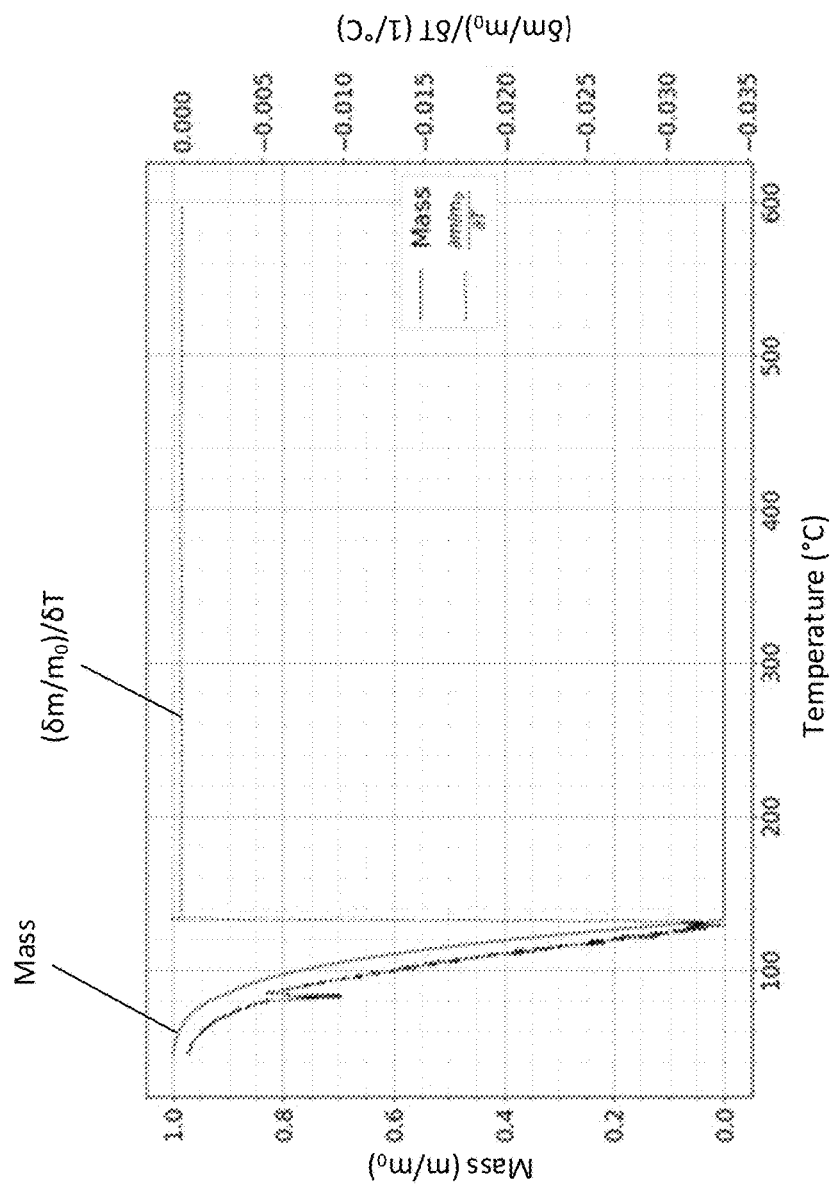
FIGS. 6A-6C illustrate thermogravimetric analyses of various primary binder components, according to some embodiments.
Figure 6B:
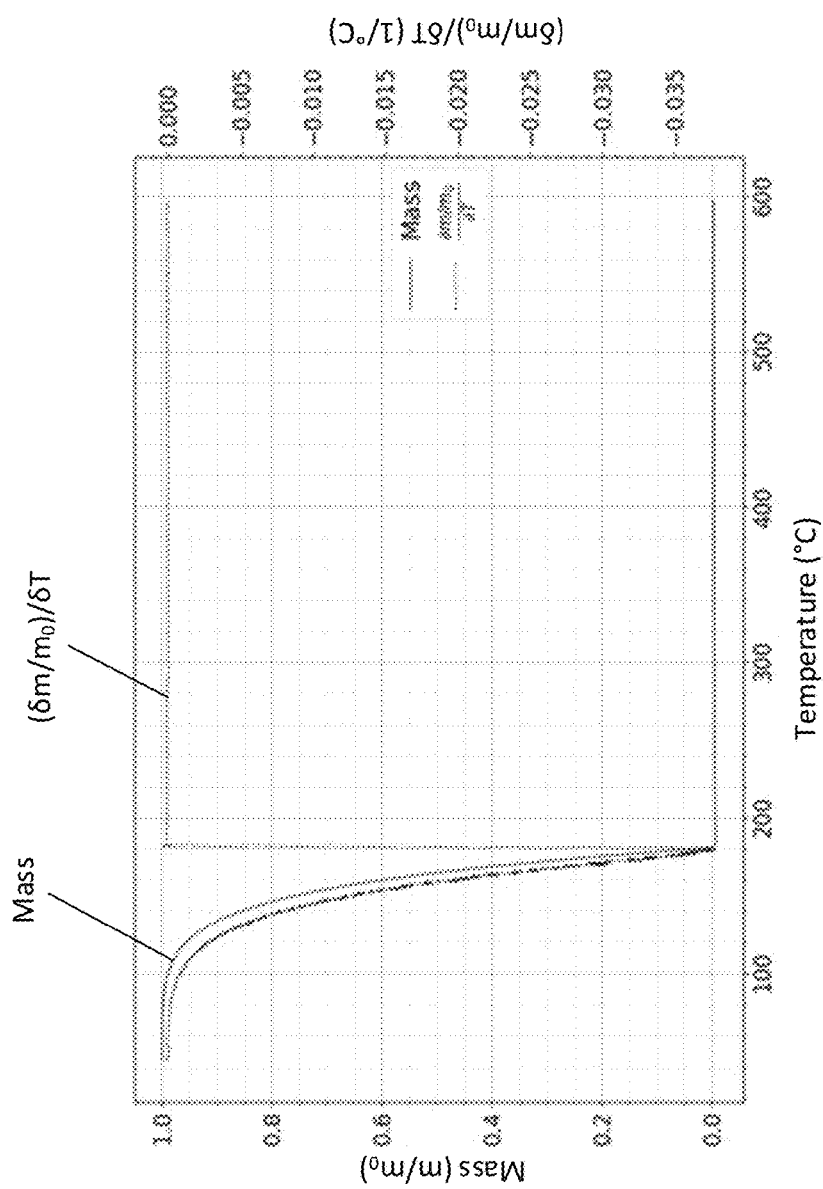
Figure 6C:
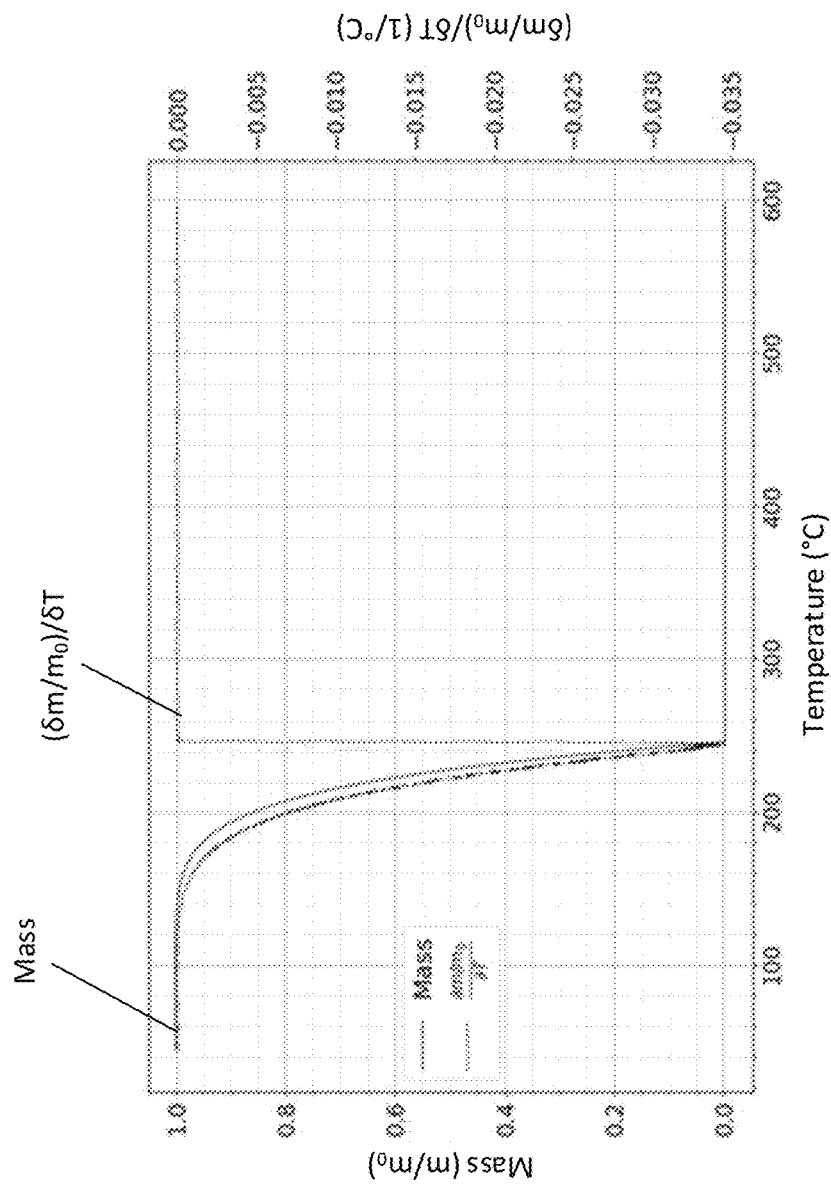

Results of a TGA analysis for selected materials from this list are shown in FIGS. 6A-6C. In particular, TGA analyses for durene, N-phenylurethane, and stearyl alcohol (1-octadecanol) are shown in FIGS. 6A, 6B and 6C, respectively. As may be noted from these figures, the TGA curves show that for each of these materials the mass loss both onsets and completes at a lower temperature than for paraffin wax.

While some of the above discussion of primary binder components indicate that one path to removal of the primary binder through thermal treatment is via sublimation of the primary binder component, it will be appreciated that the techniques described herein should not be limited solely to sublimable binders, as the techniques may also be applied to primary binder components that are removed from a part via thermal treatment through other mechanisms. For instance, the same methods, processes, and systems may be used with binders that undergo thermal decomposition (e.g., conversion to a gas). While sublimation may include a change of phase without a molecular change, thermal decomposition may entail solid-to-gas transfer with molecular changes. Such materials/compounds may also be used as primary binders to bypass the issues of solvent debinding. An illustrative binder that may undergo thermal decomposition may include ammonium bicarbonate, which may decompose into gaseous products at around 40-50° C. according to:

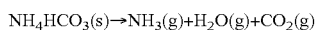

$$NH_4HCO_3(s) \rightarrow NH_3(g) + H_2O(g) + CO_2(g)$$

Yet another decomposable binder that may undergo thermal decomposition may include, at least, carbamide (urea) which may also decompose into similar gaseous compounds at around 300° C. at atmospheric pressure.

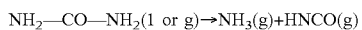

$$NH_2-CO-NH_2(l \text{ or } g) \rightarrow NH_3(g) + HNCO(g)$$

One or more of the above volatile organic compounds may be used as (or in) primary binders, since they may be both odorless and biocompatible.

As noted above, a build material containing a binder may comprise primary and secondary components of the binder. The secondary binder may commonly be removed using thermal debinding after the primary binder has been removed via thermal debinding, during which the primary binder is remove (e.g., caused to sublimate or otherwise convert to a gas as previously described). The material for the secondary binder may be selected to have a removal temperature that is higher than a removal temperature of the primary binder (e.g., higher than $T_1$ in the example of FIG. 3). Otherwise, if both the primary and secondary binders were removed at the same time, there may be no binding agents to retain the structure of the part, and removal of all binders at once may cause warping or other irregularities in the printed part. Further difficulties may arise with part deformation as similar removal temperatures also indicate similar softening and flow temperatures, since an object brought to its flow temperature (a temperature about which gravity may result in a flow) may substantially deform and fail to maintain a desired shape. As such, the secondary component of the binder may be configured to secure particles (e.g., metal particles) within a green part to retain the shape of the part once the primary binder has been removed.

A suitable secondary binder for use with a primary binder may be a polymer, such as polypropylene. The temperature at which a primary binder melts may be fairly low (e.g., approximately 80° C., but in some embodiments in the range 50° C. to 100° C.) as compared to the melting point of the secondary binder when under atmospheric pressure. Polypropylene may melt at approximately 160° C., which is higher than the melting point of the primary binder. In addition to, or instead of the melting point, the softening temperature of a polymer may also be a relevant measure of the temperature at which a polymer may deform in the case where the melting point of a polymer is not clearly defined. For instance, the Vicat Softening temperature measurement (as, for example, described in ASTM standard D 1525-00, "Standard Test Method for Vicat Softening Temperature of Plastics") may indicate a temperature at which to expect the secondary binder to flow or deform. In such cases, this softening temperature may be relied upon instead of the melting point of the secondary binder when configuring a furnace to perform a thermal debinding process (e.g., when selecting $T_2$ in the process of FIG. 3). In some cases, the various loading conditions described in the above-reference ASTM standard may yield different values of the Vicat Softening temperature and the relevant condition is that which best reflects the actual loading incumbent on feedstock of which the part is comprised.

Some embodiments may involve the use of a secondary binder with a melting point that is higher than, but close to, the melting point of a primary binder under similar pressure conditions. In some aspects, embodiments may include a secondary binder with, for example, a lower melting point than the melting point of polypropylene, so long as the melting point is above that of the primary binder. For example, polypropylene may be used, which may melt at approximately 130-160° C. Polypropylene and polyethylene are only two examples of secondary binders. Other exemplary compounds or materials for the secondary binder may include one or more thermoplastics, polyamide-imide, methyl ethyl ketone, polystyrene, polyvinyl butyryl, dibutyl phthalate, methacrylic acid ester copolymer, polylactic acid/ polylactide, acrylic, polymethyl methacrylate, polyethylene, polyvinyl alcohol, polyvinyl acetate, or combinations thereof. Further, other exemplary compounds or materials for the secondary binder may include one or more thermoplastic elastomers such as styrenic thermoplastic elastomers, thermoplastic polyolefin elastomers, thermoplastic polyester, and the like. Other specific exemplary compounds include trade name polymers such as Earneston by Kurary, Hyrbrar by Kurary, Septon by Kurary, Hytrel by DuPont, and Multiflex by Dupont, for example. For any of these secondary binders, the melting point may be higher, but close to the melting point of a selected primary binder, under the same or similar pressure conditions.

Closer melting points between the primary and secondary binders may facilitate blending of the binders when fabricating feedstock (rods or filaments). When mixing binders with very different melting points to create feedstock, some of the primary binder may sublimate or otherwise be removed because of its significantly lower melting point (and therefore larger vapor pressures) as compared to the temperature of the feedstock during the mixing process. Mixing of binders that have very different melting points may make feedstock fabrication and composition difficult to control. As a result, the choice of a secondary binder may be based at least in part on whether a primary binder expected to evaporate is used.

While the secondary binder may be chosen based on its melting point being closer to that of the primary binder for, by way of example, ease of mixing, selecting a secondary binder with a melting point near the target sublimation/ evaporation temperature of the primary binder may lead to deformation (e.g., slumping) during thermal debinding. Embodiments of the disclosure may include a secondary binder with a melting point close enough to the melting point of the primary binder to allow for the efficient blending and forming of feedstock, but high enough to ensure a stable structure until sintering.

In some embodiments, a secondary binder component may be in the form of ultrafine (also referred to as microfine) particles, e.g., with an average particle size of, for example, 1-50 μm. The primary binder may then be blended with ultrafine un-melted secondary binder and metal powder when making feedstock, which may then be formed into rods or filaments. For example, fabricated parts may be generated that include the sublimable binder and a dispersion of, e.g., un-melted polypropylene (or other secondary binder). This un-melted secondary binder may hold the part together while the primary binder converts to a gas (e.g., sublimes) during a first stage of thermal debinding. The temperature, gas composition, and pressure may then be adjusted to pyrolize or otherwise convert the secondary binder to a gas before sintering the part, for example by fully converting the secondary binder into gaseous species such as $CO$, $CO_2$, $CH_4$, and $H_2O$.

According to some embodiments, a secondary binder component may include an ultrafine high-temperature polymer powder that is not melted during mixing and formulation of the initial feedstock. This may allow or enable the incorporation of a higher temperature secondary binder that may be retained in the printed part at an elevated temperature to allow the powder particles to form necks. This may be important as the binder/feedstock mixing process and the printing process may have to be carried out at relatively low temperatures (e.g., below 100° C.) to restrict the loss of the lower temperature primary binder. Two or more secondary binders may be used in an exemplary binder system, as described above. For example, one secondary binder may melt at the mixing temperature and another secondary binder may remain in the solid phase as a fine, dispersed powder. In some embodiments, this dispersed powder binder may remain solid during the mixing and printing process. The presence of an ultrafine secondary binder may help with the gradual removal of the secondary binders, with the lower temperature secondary binder being removed first during thermal debind, followed by the higher temperature secondary binder. Other embodiments may include binders that may undergo or have a continuous phase.

Having the secondary binder ground into ultrafine particles may help ensure that the secondary binder retains the shape of the part and is not removed too quickly during thermal debinding. The ultrafine particles may be mixed more evenly in the feedstock and throughout the part. Even distribution of the ultrafine particles in the feedstock may result in a more even distribution of the secondary binder in any direction in a printed part. In this way, the secondary binder may more evenly melt and vaporize out of the part, which may permit gradual, more even binder removal to better retain the shape of a printed part as the secondary binder is removed.

According to some embodiments, a binder may comprise multiple secondary binders. For example, some embodiments may employ both a first secondary binder that has a relatively lower melting point (and does not appreciably sublimate) and a second secondary binder that has a relatively higher melting point compared to the first secondary binder. The first secondary binder may be present after removal of the primary binder. Depending on the melting point of the first secondary binder, the first secondary binder may start to melt or start to burn out at lower temp than the second secondary binder, for example, during mixing of the binders and metal powder during fabrication of the feedstock. As discussed above, the second secondary binder may be included in the feedstock as microfine, dispersed powder particles. This microfine second secondary binder may be a solid during the feedstock fabrication process, and its microfine structure may facilitate blending with the metal powder particles and the first secondary binder.

In some embodiments, the second secondary binder may remain present in the part after the first secondary binder is removed. The thermal debinding process may proceed in multiple stages as follows: (1) removal of the primary binder, (2) removal of the lower melting point first secondary binder, and then (3) removal of the higher melting point second secondary binder. Removal of the binders may not necessarily correlate with melting point. The advantage of having multiple secondary binders may be a two-stage secondary binder removal that allows for more control over the removal of the secondary binder, because not all of the secondary binder may be burned off at once. An example of the lower melting point first secondary binder may include, e.g., low-density polyethylene (LDPE). An example of the second secondary binder may include a nylon-based microfine polymer powder having a higher melting point, e.g., polypropylene or polyimide.

According to some embodiments, a build material may include at least one metal powder and/or at least one ceramic powder in addition to a binder. The binder may comprise a primary binder component and a secondary binder component. In some embodiments, the secondary binder component constitutes an amount by volume of the total binder (its vol %) that is equal to or greater than 35%, 40%, 45%, 50%, 55%, 60%, or 65%. In some embodiments, the secondary binder component constitutes an amount by volume of the total binder that is less than or equal to 75%, 65%, 60%, 55%, 50%, 45%, 40%, or 35%. Any suitable combinations of the above-referenced ranges are also possible (e.g., the secondary binder component constitutes at least 60% by volume and no more than 65% by volume of the binder).

In some embodiments, the secondary binder component has a melting point at atmospheric pressure that is equal to or greater than 140° C., 150° C., 160° C., 170° C., 180° C., 200° C., 225° C., or 250° C. In some embodiments, the secondary binder component has a melting point at atmospheric pressure that is less than or equal to 250° C., 225° C., 200° C., 180° C., 170° C., 160° C., 150° C., or 140° C. Any suitable combinations of the above-referenced ranges are also possible (e.g., the secondary binder component has a melting point at atmospheric pressure that is equal to or greater than 140° C. and less than or equal to 160° C.). Any references to the melting point of a binder component herein refer to the melting point of that material at standard pressure (e.g., 1 atmosphere).

In addition to metal powder, one or more primary binders (e.g., including at least one primary binder that may convert to a gaseous species by sublimation and/or evaporation), and one or more secondary binders, a feedstock may comprise one or more surfactants, lubricants, or plasticizers to help make the mixture of metal powder particles and binders more homogenous, lower in viscosity, and more printable. Having a homogenous, reduced viscosity feedstock formulation may enhance mixing and printing. In some embodiments, one or more of the surfactants, lubricants, or plasticizers may be liquid at room temperature, or close to extrusion/print temperature. This may make the feedstock itself more flowable, and, in some examples, feedstock that includes one or more surfactants, lubricants, or plasticizers may be formed as a filament or coil, rather than a rod. Exemplary surfactants may include steric acid. The feedstock may further include one or more tackifiers, which may promote the adhering together of layers of an additively printed 3D part.

The Tackifier/Plasticizer/Surfactant may include, e.g., one or more of stearic acid, EVA, ethylene-propylene copolymers, polyisobutenes, hydrogenated styrene-isoprene polymers, hydrogenated isoprene polymers, polymethacrylates, polyacrylates, polyalkyl styrenes, alkenyl aryl conjugated diene copolymers, polyolefins, esters, functionalized polyolefins, ethylene-propylene copolymers, 4-hydroxybenzoic acid, etc. One of the organic compound(s) may be a liquid at room temperature. Exemplary organic compounds may include oils, e.g., oleic acid, etc.

The feedstock used to fabricate parts may further include one or more tackifiers to help layers of the part adhere to one another as the parts are printed in a layer-by-layer fashion, as described above in reference to FIG. 1B. One exemplary tackifier may include ethylene vinyl acetate (EVA), which may adhere well to metal. Exemplary tackifiers may include polymers in which the individual repeat units (e.g., A) of the polymers (A-A-A-A-A- . . . -A etc.) interact to stick to materials. Other exemplary tackifiers may include different repeat units forming groups (e.g., "blocks") in the polymer, where some groups may be sticky (with respect to other binder and feedstock components) and some not. For example, in the case of di- and multi-block polymers, the groups may repeat in different ways (e.g., A-B-C-A-B-C . . . or A-A-A-A- . . . -B-B-B-B). For an exemplary di-block polymer type A-A-A-A-A-A- . . . B-B-B-B-B, one of the blocks (e.g., A-A-A-A) may be configured to interact with a first component of the binder system, or metal, or both, and the second component (e.g., B-B-B-B) may be tailored to interact with a component of the binder other than the first component or the metal, or both.

A build material may include a binder that includes a tackifier in addition to a primary binder component and a secondary binder component. Suitable tackifiers may include Elvax (ethylene vinyl acetate-based polymer) from DuPont, Bynel (anhydride-modified polyethylene) from DuPont, Elvaloy (acrylate copolymer resins (ethylene butyl-, ethyl-, and methyl-acrylates)) from DuPont, Nucrel (ethylene acrylic acid polymer) from DuPont, FG1901 G (triblock: styrene ethylene/butylene maleic anhydride) from Kraton, EMAC (Ethylene methyl acrylate copolymer) from Westlake Chemical corporation, Epolene E-25 and E-43 (maleic anhydride grafted polypropylene) from Westlake Chemical Corporation, Fusabond (Anhydride modified polypropylene) from DuPont, Co-polymers of propylene and ethylene (Eastoflex line by Eastman Chemical Company), Eastotac line by Eastman Chemical Company, Resin-based tackifiers (polyterpenes type, Pinova), poly(vinyl alcohol), poly(acetic acid), or combinations thereof.

According to some embodiments, a build material may include at least one metal powder and/or at least one ceramic powder in addition to a binder. The binder may comprise a primary binder component, a secondary binder component and at least one tackifier. In some embodiments, the tackifier constitutes an amount by volume of the total binder (its vol %) that is equal to or greater than 0.25%, 0.5%, 1%, 3%, 5%, 10%, or 15%. In some embodiments, the tackifier constitutes an amount by volume of the total binder that is less than or equal to 20%, 15%, 10%, 7%, 5%, 1%, or 0.5%. Any suitable combinations of the above-referenced ranges are also possible (e.g., the tackifier constitutes at least 0.5% by volume and no more than 2% by volume of the binder).

According to some embodiments, a build material may include at least one metal powder and/or at least one ceramic powder in addition to a binder. The binder may comprise a primary binder component, a secondary binder component and at least one wetting agent. According to some embodiments, a wetting agent may include at least one of: (1) stearic acid, sodium stearate, zinc stearate, or other similar metal stearates; (2) linoleic acid or other similar polyunsaturated fatty acids; (3) behenic acid, palmitic acid, or other similar fatty acids having between 4 and 40 carbons; (4) titanate coupling agents, such as isostearyl titanate, stearyl titanate, oleyl titanate, pyrophosphate titanate, tetraethyl orthotitanate, monoalkyl titanates, neoalkyl titanates, and the like; (5) siliane coupling agents such as aminopropyl trimethoxy silane, and the like, glycidoxypropyl trimethoxy silane, and the like, vinyltrimethoxysilane, vinylsilane, vinyltriisopropylsilane, vinyltryethoxysilane, and the like; (6) zirconate coupling agents such as neoalkyl zirconates, zirconium tetrapropoxide, zirconium tetrabutoxide, zirconium propionate, zirconium methacrylate, zirconium acetylacetonate, and the like; (7) aluminate coupling agents such as zircoaluminates, Plenact AL-M (alkylacetoacetate aluminum di-isopropylate from Ajinimoto Fine-Techno Co., Inc.); (8) zwitterionic surfactants such as those containing both amino and sulfonate groups (e.g., 3-(N,N-dimethylmyristylamino) propanesulfonate, CHAPS, and the like); and (9) catechol containing molecules such as catechol, 4-ethylcatechol, 3-methoxycatechol, 4-methyl catechol, ethyl gallate, and the like.

The specific choice of the wetting agent will depend upon the target discrete phase (e.g., the specific powders) to be compounded, as well as the specific binder components selected or desired. For example, materials with a refractory discrete phase may prefer the use of a titanate, silane, or zirconate coupling agent where the titanium, zirconium, and/or aluminum may be favorably incorporated with the discrete phase. Further, the use of a stearic acid, polyunsaturated fatty acid, or a saturated fatty acid may be preferred when metal-based wetting agents are to be avoided.

According to some embodiments, a build material may include at least one metal powder and/or at least one ceramic powder in addition to a binder. The binder may comprise a primary binder component, a secondary binder component and at least one wetting agent. In some embodiments, the wetting agent constitutes an amount by volume of the total binder (its vol %) that is equal to or greater than 0.25%. In some embodiments, the tackifier constitutes an amount by volume of the total binder that is less than or equal to 15% Any suitable combinations of the above-referenced ranges are also possible (e.g., the tackifier constitutes at least 0.5% by volume and no more than 0.75% by volume of the binder).

Several illustrative binder formulations will now be presented that each includes a high molecular weight component as a secondary binder. The high molecular weight components were screened based upon their ability to burn out cleanly during thermal processing, and also to impart suitable feature definition and part quality when the object is created during the fabrication process. Further, all components were selected to permit the high (>60%) loading of solids as well as sufficient layer adhesion to enable a well-adhered part during fabrication. Several formulation embodiments are provided in Table 1, shown below.

TABLE 1

| Component | Component fraction by wt % | | | | | | | |
|---|---|---|---|---|---|---|---|---|
| | F1 | F2 | F3 | F4 | F5 | F6 | F7 | F8 |
| Metal Powder | 93.3 | 93.2 | 94.0 | 95.6 | 93.5 | 94.6 | 94.6 | 95.2 |
| Primary binder component | — | — | — | 2.3 | — | 2.9 | 2.8 | 2.5 |
| Durene | 2.3 | — | — | — | — | — | — | — |
| EVA | 1.3 | — | — | — | — | — | — | — |
| Paraffin Wax | 0.6 | — | — | — | — | — | — | — |
| LDPE | 2.3 | — | — | — | — | — | — | — |
| Poly(propylene carbonate) | — | 2.7 | — | — | — | — | — | — |
| Ethylene Bis(stearamide) wax | — | — | 1.2 | — | 1.3 | — | — | — |
| Vanillin | — | — | — | — | 2.1 | — | — | — |
| High MW Polypropylene | — | 2.7 | 2.4 | 1.7 | 2.3 | 2.2 | 2.1 | 1.9 |
| Low MW Polypropylene copolymer | — | — | — | 0.3 | — | 0.3 | 0.4 | 0.3 |
| Wetting agent | 0.1 | 1.4 | 2.4 | <0.1 | 0.8 | 0.1 | 0.1 | <0.1 |

Formulations in this table illustrate both more promising and less promising formulations, as defined by our requirements, including the desire to remove the primary component(s) prior to the softening of the secondary polymer. Formulation F1 achieved excellent mass loss of the primary binder in advance of the secondary binder softening temperature during thermal processing, but was difficult to process owing to the loss of primary binder (durene) during the processing and deposition of the feedstock material as well as the storage of the feedstock in between fabrication.

Formulation F2 does not include a significant amount of low molecular weight polymer (the steric acid is typically added as a wetting agent to compatiblize the polymer and the discrete solid phase), primarily poly(propylene carbonate) and high molecular weight poly(propylene). Feedstock made from this formulation display an unacceptable amount of deformation after, and as a result of, furnace processing. The mechanism of failure is related to the inability to separate the removal and flow temperatures of the binding agents.

Similar to formulation F2, formulations F3 and F5 perform poorly during thermal processing. The deformation of the material is again related to the inability to remove the lower melting point primary binder before the secondary binder melts and the object becomes mobile. In the case, the Ethylene bis(stearamide) wax persists over too great a temperature range prior to the onset of secondary binder melting and feedstock flow.

Formulations F4, F6, F7, and F8, were observed to behave acceptably during thermal processing. In these formulations, the element listed as a "primary binder component" may include any of the above-described primary binder components such as Docosane, Eicosane, Octadecane, 1-docosanol, 1-eicosanol, 1-octadecanol, n-docosanol, n-eicosanol, n-octadecanol or combinations thereof.

Figure 7:
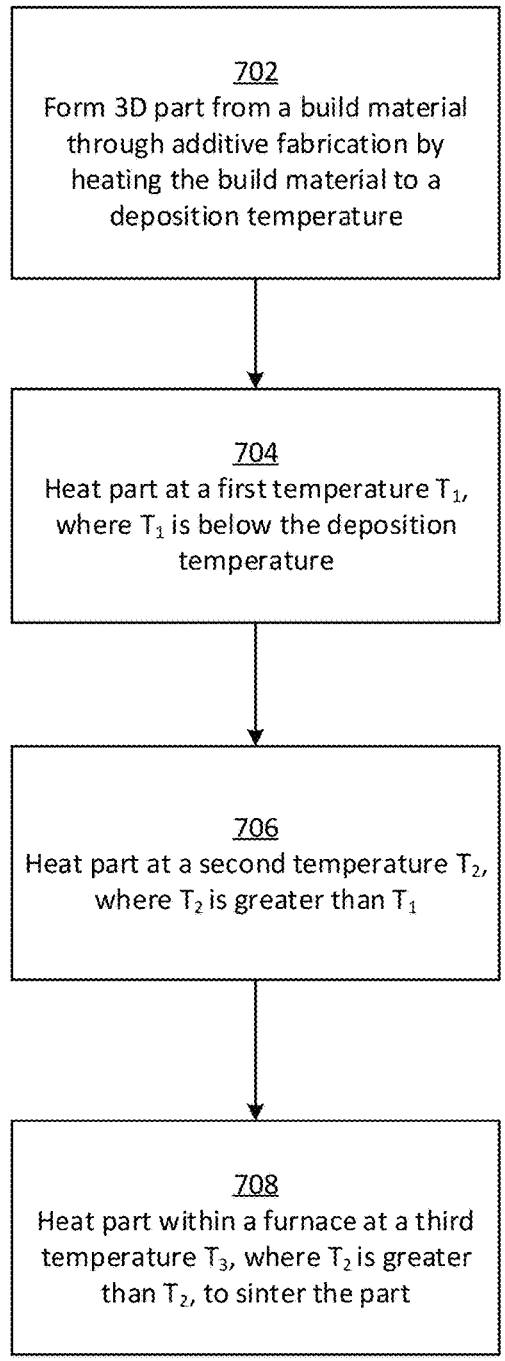
FIG. 7 is a flowchart of a method of forming a metal part through additive fabrication and thermal debinding techniques, according to some embodiments.

FIG. 7 is a flowchart of a method 700 for fabricating a three-dimensional metal part. The method 700 may be performed by a suitable additive fabrication system such as additive manufacturing system 200 shown in FIG. 2A. In act 702, a part is fabricated using an additive fabrication process such as fused filament deposition (FFF). The part may be fabricated from a build material comprising a metal powder and a binder, wherein the binder includes a primary binder component and a secondary binder component. In some embodiments, the part may be fabricated in part with a second build material comprising a ceramic powder. The second build material may include a different binder, or the same binder, as the build material comprising the metal powder. In some embodiments, act 702 may comprise fabrication of a part using an FFF device that include multiple deposition nozzles to deposit the ceramic and metal feedstocks to separate desired locations.

In some embodiments, it may be desirable to package and/or shape the build material in a specific form suitable for use by a deposition mechanism of the additive fabrication system (e.g., the extrusion head 132 of fused filament fabrication subsystem 102 shown in FIG. 1B and discussed above). Some illustrative forms may include a build material shaped as a rod of controlled length and diameter (e.g., a length between 10 mm and 300 mm, and a diameter between 1 mm and 10 mm), a build material coiled as a rope or long cord (that is, long as compared to the diameter, e.g., 5 m long and 1.75 mm in diameter), a build material provided as a series of small segments such as granules, etc.

In some embodiments, the shaped build material may be packaged and/or encapsulated with a thin coating to prevent or substantially reduce any interaction between the build material in shaped form (e.g., a rod) and the surrounding environment. These interactions may include the evolution of any binder components (including the primary binder components) as a gas through evaporation or sublimation resulting in the concentration decrease of said binder components within the shaped build material, for example. The thin coating may act to suppress these actions by forming a physical barrier that is impermeable, nearly impermeable, or of high resistance to the transport of binder species in solid, liquid, or gaseous form. In selecting materials for the coating, it may be desirable to utilize materials which are already present in the build material, for example, utilizing a thin film of the secondary binder or a component of the secondary binder. In other cases, it may be desirable to utilize materials which are not present in the build material for the case where some materials are easily mixed with primary binder and powders (and are good secondary binders) whereas other materials are impermeable and are amenable to coating (and are good physical barriers). In addition to the secondary binders already identified, some additional materials may include poly(vinyl acetate), acrylics, poly(carbonate), poly(caprolactone), poly(ethyleneimine), and paraffin wax. By way of non-limiting example, these materials may be deposited as a thin film using a solvent casting technique, spray drying technique, or by co-extrusion. Depending upon the material chosen, the inclusion of the coating may have the added benefit of improving the mechanical strength of the packaged build material, or otherwise rendering the packaged build material less susceptible to mechanical damage, fracture, and/or breakage as compared to the same packaged build material absent the coating.

The subsequent acts 704, 706 and 708 in FIG. 7 may be performed by a furnace as described above in relation to FIG. 3. In particular, act 704 may relate to stage 310 of FIG. 3, act 706 may relate to stage 320, and act 708 may relate to stage 330. As such, the above-described operations and parameters associated with those portions of FIG. 3 may be assumed to apply to these acts of FIG. 7.

In act 704, the furnace chamber may be maintained at the first temperature and pressure until all or most of the primary binder has sublimated and/or evaporated and escaped from the part. In some aspects, the furnace chamber may maintain the first temperature and pressure for a period of time long enough to allow removal of the primary binder (or substantially all of the primary binder) to occur, while in others, one or more pressure of the furnace chamber may be monitored, e.g., by using one or more pressure gauges, to detect when the evolution of the primary binder to a gas, and its sublimation, may have ended. For example, as the primary binder turns into a gas and escapes from the part, the added gas within the chamber may cause a pressure increase. Accordingly, a pressure increase may indicate that conversion to a gas is still occurring, while a change, e.g., a stop, in pressure increase may indicate that all or most of the primary binder has been removed (i.e., sublimated or evaporated out of the part). The correlation between conversion to a gas and pressure may not be direct, e.g., other components of the part may also vaporize during primary thermal debinding, but a known relationship may exist to allow monitoring of the conversion process.

In some embodiments, a sensor such as a mass spectrograph or residual gas analyzer may be connected to the furnace exhaust to monitor the effluent. Determination of the progress of the primary debinding process may be indicated by the concentration or presence of species related to the primary binder in the effluent gas stream. In a further embodiment, the effluent gas stream may be brought to flow through a catalytic converter consuming and converting both the debound primary binder species and a participating gas such as oxygen or carbon monoxide. Since the concentration of a participating gas such as oxygen or carbon monoxide may be consumed during the conversion or consumption of the primary binder species, a chance in the concentration of the participating gas may indicate the degree to which the primary binder species are present and thus the degree to which the primary debind process is complete.

Once primary debinding of the primary binder material has finished, the furnace may adjust to achieve a partial pressure within the furnace chamber and to heat to a second temperature, higher than the first temperature (act 706). At this point, the three-dimensional object may be comprised of the secondary binder and the metal powder particles, the primary binder having already been removed from the three-dimensional object during the primary debinding step.

The second temperature and partial pressure may correspond with a removal temperature and pressure of the secondary binder. This second temperature may be higher than the debind temperature of the primary binder, but lower than the melting point (or sintering temperature) of the powder particles to be sintered. The furnace chamber may be maintained at the second temperature and partial pressure for long enough to allow the secondary binder to burn off and to vaporize from the object. As discussed above in reference to act 704, pressure within the furnace chamber may be monitored to determine whether removal of the secondary binder is complete, or the furnace chamber may simply maintain the temperature and pressure for a given amount of time.

Once the secondary binder has been removed from the object, the furnace may be heated to a third temperature (act 708). The third temperature may be higher than the first and the second temperatures and lower than a melting point temperature of the metal powder particles. The third temperature may correspond with a sintering temperature of the metal powder, and the third temperature may be maintained long enough to sinter the metal object. The three-dimensional object may at this point be comprised of metal (or other material of which the powder is comprised), since both the primary and secondary binders may have been removed, e.g., during acts 704 and 706.

In some embodiments, acts 702 and 704 may occur at least partially simultaneously wherein the initial debinding step of act 704 may occur while the part is being fabricated in act 702. For instance, the additive fabrication device may be configured to begin primary debinding while the part is being formed by operating a source of directed energy (such as a laser, radiant beam, intense light, or the like) to direct energy onto selected regions of the formed object for set duration of time. The specific regions may be points, lines, or areas depending upon the nature and number of the directed energy source(s). The directed energy sources may locally increase the temperature of the deposited object to encourage the conversion of the primary binder to a gas through, either individually or in concert, evaporation and sublimation. Further, the deposition process may be interrupted to provide for the application of the directed energy source, or the deposition process may proceed uninterrupted while the directed energy source is directed toward and acting upon the part during fabrication.

In some embodiments, primary debinding in act 704 may be initiated during the fabrication process of act 702 by elevating the temperature within the deposition apparatus. This may for instance be accomplished by operating a conductive heater coupled to the build platform upon which the part being fabricated, the forced convection of a heated gas, and/or other similar heat transfer mechanism. As described previously, the deposition apparatus may optionally be configured with a filter or filtration system to collect and manage the debind effluent. By way of non-limiting example, such a collection and management system may include a charcoal system, a chilled surface permeable to flow with high surface area, or other high surface area object held at a temperature less than the temperature of the chamber and sufficiently cold to capture any primary binder species present as a gas.

While method 700 is described for simplicity in reference to an object comprised of one primary binder and one secondary binder, it is acknowledged that, as described above, more than one primary or more than one secondary binder may be used to form an additively manufactured object. In such embodiments, the furnace may be heated to more than one primary debinding temperature or more than one secondary debinding temperature. Accordingly, the furnace may be configured to process the object by achieving a range of temperatures with at least three incrementally higher hold temperatures where the furnace may be operated to control the temperature to be constant for some period of time. Such operation of the furnace may result in the sequential removal of multiple primary or secondary binders, though the individual or combined actions of sublimation and vaporization.

In some embodiments, at least one controller may be configured to automatically operate a furnace to perform acts 704, 706 and 708. For instance, at least one controller may be configured to adjust the temperature of the furnace over time according to a planned temperature treatment schedule such as that shown in FIG. 3. In some embodiments, the at least one controller may also be configured to operate components to control gas flow into and/or out of the furnace, such as one or more pumps and valves according to a schedule. The at least one controller may be configured to select a suitable schedule to control the temperature (and optionally pressure) of the furnace over time based on inputs provided to the furnace, such as a type of metal powder present in the parts, the primary binder material, the secondary binder material, and/or other inputs. Said inputs may be provided by a user (e.g., via a user interface on the furnace or a device configured to communicate with the furnace) and/or by another device within the additive fabrication system such as the fabrication device used to form the part(s) in act 702.

Figure 8:
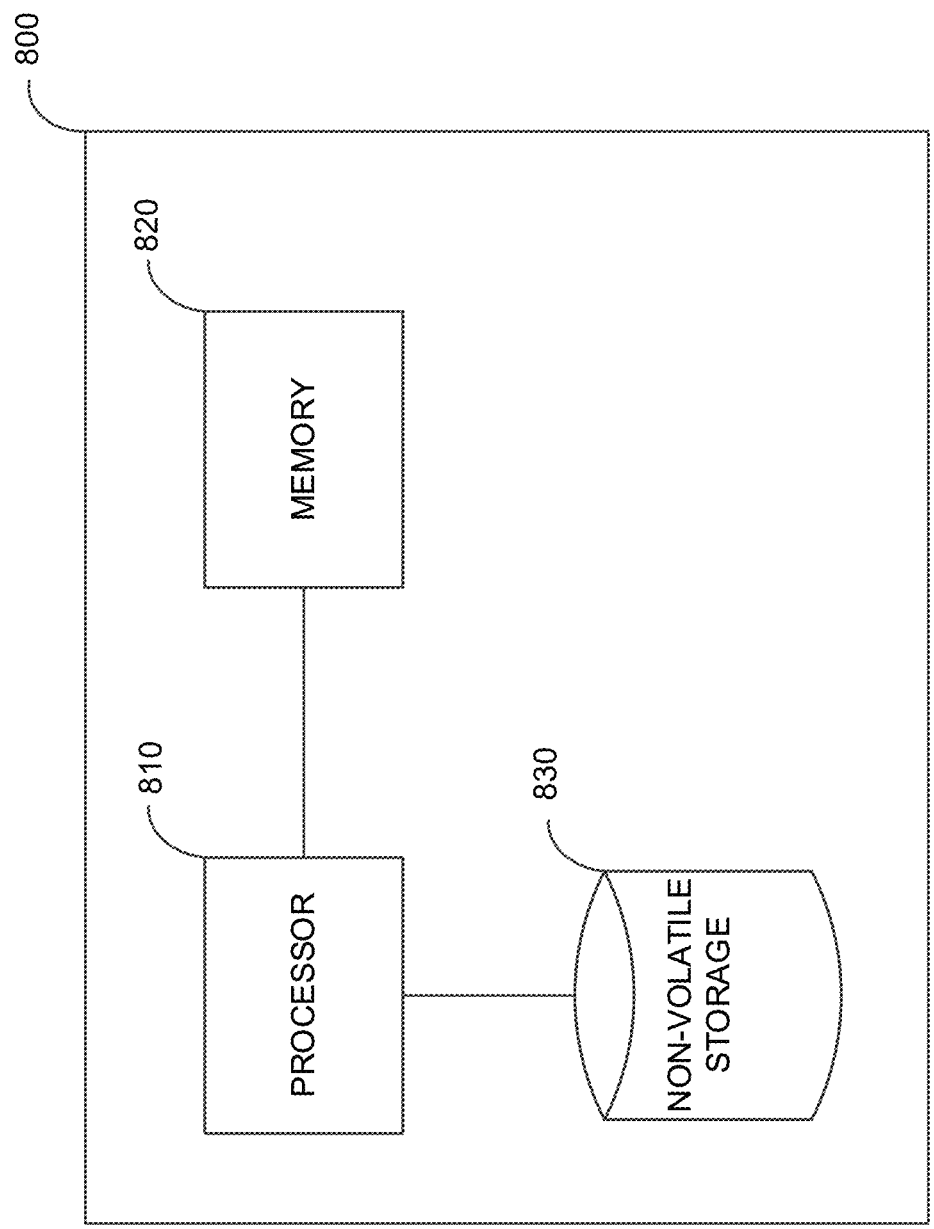
FIG. 8 illustrates an example of a computing system environment on which aspects of the invention may be implemented.

An illustrative implementation of a computer system 800 that may be used to control a furnace according to any of the techniques described above is shown in FIG. 8. The computer system 800 may include one or more processors 810 and one or more non-transitory computer-readable storage media (e.g., memory 820 and one or more non-volatile storage media 830). The processor 810 may control writing data to and reading data from the memory 820 and the non-volatile storage device 830 in any suitable manner, as the aspects of the invention described herein are not limited in this respect. To perform functionality and/or techniques described herein, the processor 810 may execute one or more instructions stored in one or more computer-readable storage media (e.g., the memory 820, storage media, etc.), which may serve as non-transitory computer-readable storage media storing instructions for execution by the processor 810.

In connection with techniques described herein, code used to, for example, generate instructions that, when executed, cause an additive fabrication device to fabricate one or more parts, cause a furnace to automatically perform a schedule of thermal treatment may be stored on one or more computer-readable storage media of computer system 800. Processor 810 may execute any such code to perform any of the above-described techniques as described herein. Any other software, programs or instructions described herein may also be stored and executed by computer system 800. It will be appreciated that computer code may be applied to any aspects of methods and techniques described herein. For example, computer code may be applied to interact with an operating system to transmit instructions to an additive fabrication device or furnace through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

According to the foregoing, thermal debinding may address current issues with solvent debinding. Thermal debinding may involve using one or more primary binders and furnaces built to achieve temperature and pressure conditions for the primary binder(s) to sublimate. The furnaces may also be configured to capture and recycle sublimated primary binder, and to detect complete sublimation of the primary binders. Secondary binders may also be selected, in view of the use of primary binders. For instance, secondary binders that melt well with (or are miscible with) the primary binders during feedstock fabrication may be preferred over traditional secondary binders. In addition, multiple secondary binders may be used to maintain the shape of a printed object as the various binders are removed via thermal processing. Some secondary binders may include ultrafine, dispersed powder particles that may remain as solids until they melt/vaporize at a final debinding stage. The melting points of such ultrafine powder binders may be higher than those of other binders, but lower than the melting point of metal powder particles in the feedstock/printed part. In other embodiments, the ultrafine powder binders may not melt completely or at all; in such embodiments the ultrafine powders may be comprised of cross-linked polymers (e.g., crosslinked poly methyl methacrylate, crosslinked poly butyl methacrylate, or other similar polymers) where the degree of crosslinking may be in the range of 1 to 10%, 5 to 50%, or up to 100%. When crosslinked materials are utilized as ultrafine particles, they may decompose (e.g., not melt) upon heating to the appropriate temperature, which may be 300° C.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A build material for additive fabrication, the build material comprising:
    a rod or filament comprising at least one metal powder blended with a binder, the binder comprising:
        a primary binder component having a melting point above 40° C. and below 140° C., and having a vapor pressure above 0.05 Torr at all temperatures between 50° ° C. and 160° C.; and
        a secondary binder component including solid particles dispersed within the build material, wherein the solid particles of the secondary binder component have a higher melting point than the primary binder component.

2. The build material of claim 1, wherein the primary binder component has a vol % within the binder of at least 30 vol % and less than 60 vol %.

3. The build material of claim 2, wherein the primary binder component has a vol % within the binder of at least 40 vol % and less than 50 vol %.

4. The build material of claim 1, wherein the primary binder component has a melting point above 50° C. and below 80° C.

5. The build material of claim 1, wherein the primary binder component is a fatty alcohol.

6. The build material of claim 5, wherein the primary binder component is octadecanol.

7. The build material of claim 1, wherein the secondary binder component comprises polypropylene.

8. The build material of claim 1, wherein the secondary binder component has a vol % within the binder of at least 40 vol % and less than 60 vol %.

9. The build material of claim 1, wherein the secondary binder component comprises an ultrafine or microfine powder.

10. The build material of claim 9, wherein the ultrafine or microfine powder has an average particle size between 1 μm and 50 μm.

11. The build material of claim 1, wherein the secondary binder component is a first secondary binder component, and wherein the binder further comprises a second secondary binder component having a lower melting point than the melting point of the first secondary binder component.

12. The build material of claim 11, wherein the first secondary binder component comprises polypropylene or polyimide and wherein the second secondary binder component comprises low-density polyethylene (LDPE).

* * * * *